US012204066B2

(12) United States Patent
Hargrave et al.

(10) Patent No.: US 12,204,066 B2
(45) Date of Patent: Jan. 21, 2025

(54) SYSTEMS AND METHODS FOR TERAHERTZ IMAGING

(71) Applicant: Sequestim Limited, Didcot (GB)

(72) Inventors: Peter Hargrave, Cardiff (GB); Peter Ade, Cardiff (GB); Andreas Papageorgiou, Cardiff (GB); Samuel Rowe, Cardiff (GB); Simon Doyle, Cardiff (GB)

(73) Assignee: Sequestim Limited, Didcot (GB)

( * ) Notice: Subject to any disclaimer, the term of this patent is extended or adjusted under 35 U.S.C. 154(b) by 59 days.

(21) Appl. No.: 17/760,242

(22) PCT Filed: Feb. 5, 2021

(86) PCT No.: PCT/EP2021/052828
§ 371 (c)(1),
(2) Date: Aug. 5, 2022

(87) PCT Pub. No.: WO2021/156450
PCT Pub. Date: Aug. 12, 2021

(65) Prior Publication Data
US 2023/0105624 A1 Apr. 6, 2023

(30) Foreign Application Priority Data
Feb. 7, 2020 (GB) .................... 2001711

(51) Int. Cl.
G01V 8/00 (2006.01)
G01N 21/3581 (2014.01)
(Continued)

(52) U.S. Cl.
CPC ............ *G01V 8/005* (2013.01); *G02B 23/08* (2013.01); *G02B 26/105* (2013.01)

(58) Field of Classification Search
None
See application file for complete search history.

(56) References Cited

U.S. PATENT DOCUMENTS 4,733,955 A 3/1988 Cook
5,550,672 A 8/1996 Cook
(Continued)

FOREIGN PATENT DOCUMENTS

CN 104713641 B 1/2017
CN 109755708 * 5/2019
(Continued)

OTHER PUBLICATIONS

Castillo-Dominguez et al., "Mexico-UK Sub-millimeter Camera for Astronomy", Journal of Low Temperature Physics (2018) 193:1010-1015.
(Continued)

*Primary Examiner* — Christopher Braniff
(74) *Attorney, Agent, or Firm* — SLEMAN & LUND LLP

(57) ABSTRACT

Certain examples relate to a terrestrial terahertz imaging system. In one example, the terrestrial terahertz imaging system has an imaging assembly to form a first image of at least a portion of an object using electromagnetic radiation in a terahertz band of frequencies and a receiver assembly comprising a cryostat. The cryostat contains a detector and reflective cold re-imaging optical components to receive the electromagnetic radiation from the imaging assembly. The reflective cold re-imaging optical components form a second image of at least a portion of the object on the detector. The imaging assembly has reflective optical components arranged in a confocal configuration that is arranged to image at finite conjugates. The reflective cold re-imaging optical components implement a reflective, confocal optical relay. Other examples relate to body and vehicle scanning devices that may be used in security applications.

18 Claims, 11 Drawing Sheets

(51) Int. Cl.
  *G02B 23/08* (2006.01)
  *G02B 26/10* (2006.01)

(56) References Cited

U.S. PATENT DOCUMENTS

| | | | |
|---|---|---|---|
| 5,969,860 A | 10/1999 | Mearns | |
| 7,944,559 B2 | 5/2011 | Oskotsky | |
| 7,952,799 B2 | 5/2011 | Bentley | |
| 2003/0179444 A1 | 9/2003 | Cook | |
| 2004/0156132 A1 | 8/2004 | Garcia | |
| 2007/0114418 A1* | 5/2007 | Mueller | G01J 3/42 |
| | | | 250/341.1 |
| 2010/0110539 A1 | 5/2010 | Cook | |

FOREIGN PATENT DOCUMENTS

| | | |
|---|---|---|
| EP | 2869046 A1 | 5/2015 |
| EP | 2876479 A1 | 5/2015 |
| GB | 2119117 B | 7/1985 |

OTHER PUBLICATIONS

Galitzki et al., "The Next Generation BLAST Experiment", Journal of Astronomical Instrumentation, vol. 3, No. 2, 2014, 16 pages.

Grossman E N et al, "A passive, real-time, terahertz camera for security screening, using superconducting microbolometers", Microwave Symposium Digest, 2009. MTT '09. IEEE MTT-S International, IEEE, Piscataway, NJ, USA, (Jun. 7, 2009), ISBN 978-1-4244-2803-8, pp. 1453-1456, XP031490803.

Kashima et al., "A wide field-of-view crossed Dragone optical system using the anamorphic aspherical surfaces", arXiv: 1712.05139v2 Jun. 5, 2018, 8 pages.

Luukanen Arttu et al, "Passive broadband terahertz camera for stand off concealed threat identification using superconducting antenna-coupled microbolometers", Microwave Conference, 2008. EUMC 2008. 38th European, Piscataway, NJ, USA, doi:10.1109/EUMC.2008.4751610, ISBN 978-2-87487-006-4, (Oct. 1, 2008), pp. 943-946, URL: http://citenpl.internal.epo.org/wf/storage/17AED8F92BF0012FDC4/originalPdf#zoom=100, XP055828575.

Monson Andrew et al, "BIRCAM: A Near-Infrared Camera for The University of Wyoming Red Buttes Observatory," Publications of the Astronomical Society of the Pacific, 121:728-734, Jul. 2009.

Moon Bongkon et al, "KASINICS: Near Infrared Camera System for the BOAO 1.8m Telescope," Publ. Astron. Soc. Japan 60, 849-856, Aug. 25, 2008.

Nuria Llombart et al., "Range refocusing in a terahertz imaging radar", Microwave Integrated Circuits Conference (EUMIC), 2012 7th European, IEEE, (Oct. 29, 2012), ISBN 978-1-4673-2302-4, pp. 227-229, XP032345565.

Rowe Sam et al., "A passive terahertz video camera based on lumped element kinetic inductance detectors", Review of Scientific Instruments, AIP, Melville, NY, US, vol. 87, No. 3, doi:10.1063/1.4941661, ISSN 0034-6748, (Jan. 1, 2016), (Jan. 1, 1901), XP012205740.

* cited by examiner

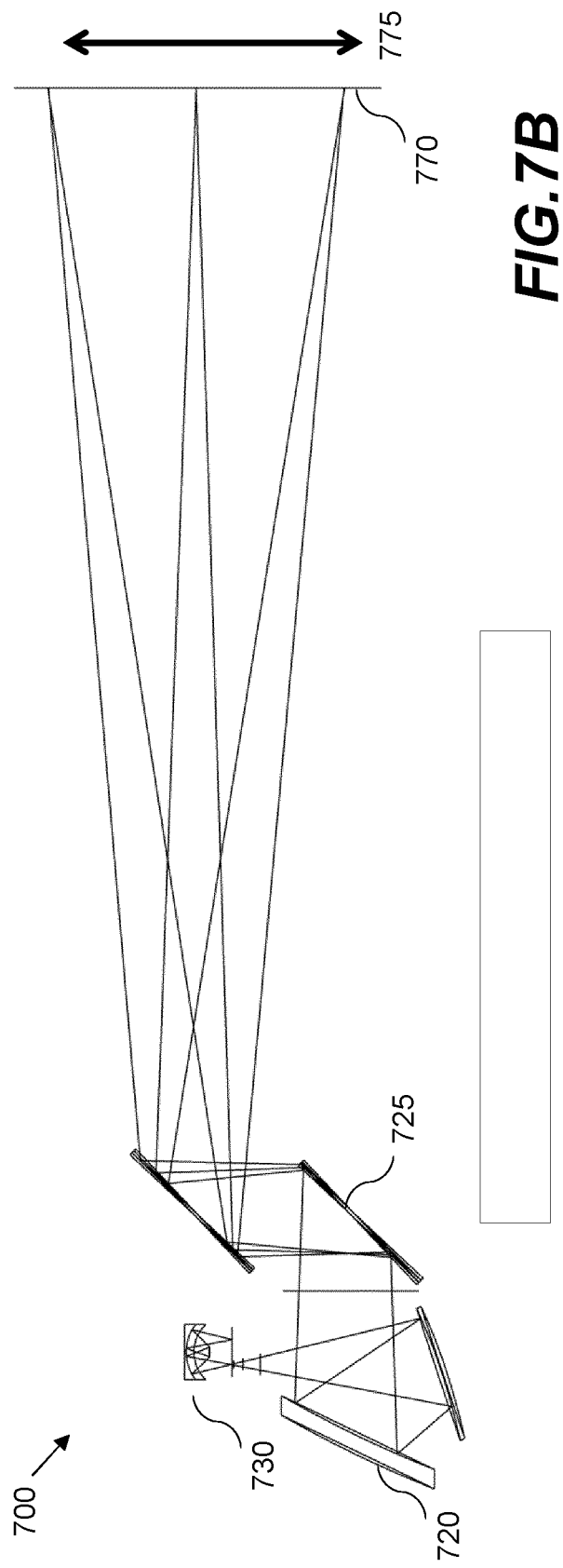
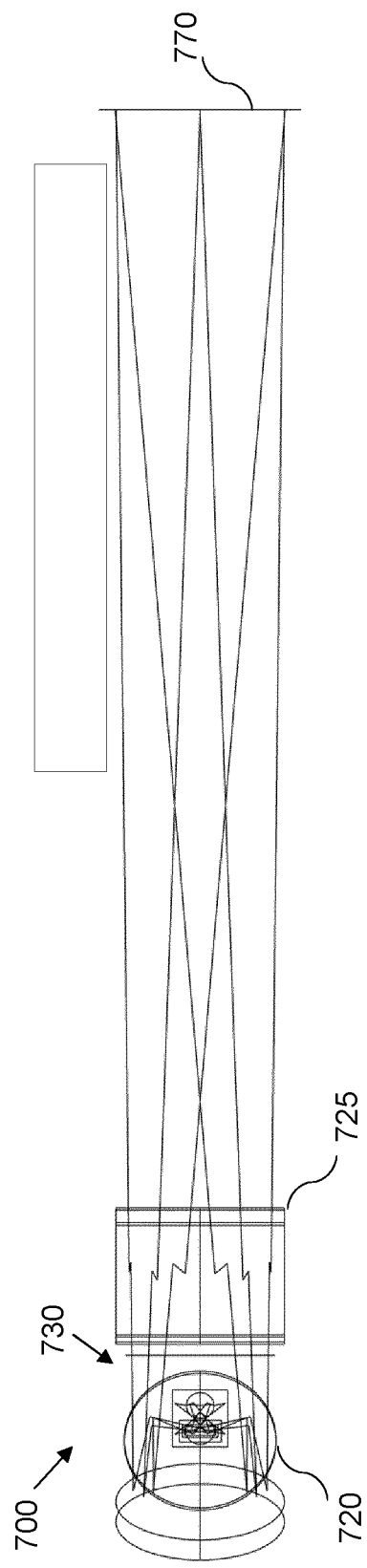
FIG. 7B
FIG. 7C

SYSTEMS AND METHODS FOR TERAHERTZ IMAGING

FIELD OF THE INVENTION

The present invention relates to generating images using electromagnetic radiation in a terahertz band of frequencies. The present invention may be used for terrestrial measurement or observation. The present invention may find particular utility in the field of security systems.

BACKGROUND OF THE INVENTION

Urban infrastructure across the world faces a constant threat of attack. Urban environments such as transport hubs, office blocks, and shopping centres experience large and changing flows of pedestrians and vehicles. These environments are difficult to police. Airports, for example, have several stages of security to attempt to detect smuggled threats and contraband. Many of these stages are labour intensive and require 24-hour vigilance. They also introduce delays for passengers and increase journey times.

Terahertz imaging has potential for security scanning applications. Terahertz radiation, which may be defined as electromagnetic radiation within a band of frequencies such as 0.1 to 30 THz, is able to penetrate thin layers of material but is blocked by thicker objects. Although the field is relatively new, certain prototypes have demonstrated that terahertz radiation can penetrate outer layers of clothing to allow hidden weapons to be located. Moreover, different materials have different patterns of emission and/or reflection within this frequency band, providing the potential for material characterisation and/or detection.

US 2011/0133087 A1 describes a terahertz imaging system that comprises a scanning component for scanning a field of view. The scanning component is tracked by an optical beam to obtain positional information. The optical tracking beam can be steered by the scanning component for example by reflection, refraction or diffraction. The steered tracking beam can then be detected by a spatially sensitive detector such as a charge-coupled device array. In a preferred embodiment, the output of a terahertz detector receiving terahertz radiation from the scanned field of view is used to modulate the tracking beam. This means that the spatially sensitive detector can provide an image directly derived from the scanning of the field of view by the terahertz radiation.

The paper "A passive THz video camera based on lumped element kinetic inductance detectors" by Rowe et al., published in the Review of Scientific Instruments 87.3 in 2016 describes a prototype 350 GHz video camera that may form a basis for general purpose terrestrial terahertz imaging applications. The camera currently operates at a quasi-video frame rate of 2 Hz with a noise equivalent temperature difference per frame of ~0.1 K, which is close to the background limit. The camera makes use of lumped element kinetic inductance detectors and image information is read out through a single microwave feedline with a cryogenic low noise amplifier and room temperature frequency domain multiplexing electronics.

As the field is in its infancy, there are issues in designing a terahertz imaging system that is suitable for use in the aforementioned urban environments. For example, the images generated by the prototype video camera in the paper by Rowe are noisy and of low quality, despite having an advantage of laboratory conditions. There is also an issue of designing terahertz imaging systems that can cope with high through-flows of objects, such as people and vehicles. These issues are compounded by the constraints of terahertz radiation detectors, which are typically sensitive devices that are easily overwhelmed by local noise sources within the terahertz ranges and beyond.

SUMMARY OF THE INVENTION

Aspects of the present invention are set out in the appended independent claims. Variations of these aspects are set out in the dependent claims.

Further features and advantages of the invention will become apparent from the following description, which is made with reference to the accompanying drawings.

BRIEF DESCRIPTION OF THE DRAWINGS

FIG. 7B is a side view of optical components for an example terahertz imaging system.

FIG. 7C is top view of optical components for an example terahertz imaging system.

DETAILED DESCRIPTION OF THE INVENTION

Certain examples described herein relate to terrestrial terahertz imaging systems.

The term "terrestrial", as used herein, refers to a non-astronomic use, e.g. a use for imaging objects on the ground or in the air of a planet such as Earth. Although terahertz imaging systems exist for use in the field of astronomy, e.g. as part of telescopes and the like, these systems are ill-suited to imaging objects on a range of metres. Instead, telescope systems are designed to view small portions of the sky where the object plane is assumed to be at infinity. For example, many comparative terahertz imaging systems designed for astronomy have a very narrow field of view (e.g. measured in arcseconds). However, to image objects on the Earth, e.g. for terrestrial imaging, the field of view is measured in degrees or portions of degrees. It should be noted that ""terrestrial" as used herein also includes airborne imaging, e.g. aircraft using the imaging system to capture images of objects on the ground or also in the air, and imaging on planets that are not the Earth, e.g. they may be used for object imaging on the ground or in the atmosphere of other planets such as Mars.

The term "terahertz" is used to denote a particular band of high frequency electromagnetic radiation. Terahertz radiation may encompass "terahertz" bands as defined by the International Telecommunication Union (ITU), such as 0.1 to 30 THz. Terahertz radiation is also sometimes referred to as a submillimetre band, as in encompasses wavelengths of 1 mm and less (e.g. 0.3 THz and above).

The term "imaging system" is used to refer to a system that is configured to capture images of an object. These may be one or two-dimensional images. In certain cases, the images may comprise frames of video. The images are formed by terahertz radiation emitted and/or reflected by the object. These images may differ from conventional colour images in that they allow objects to be viewed through different layers of optically occluding material. The imaging systems described herein may be passive and/or active, i.e. may receive naturally emitted and/or reflected radiation and/or may illuminate an object with a source of terahertz radiation and image the emitted and/or reflected radiation. Passive imaging systems may be preferred when imaging people.

Figure 1:
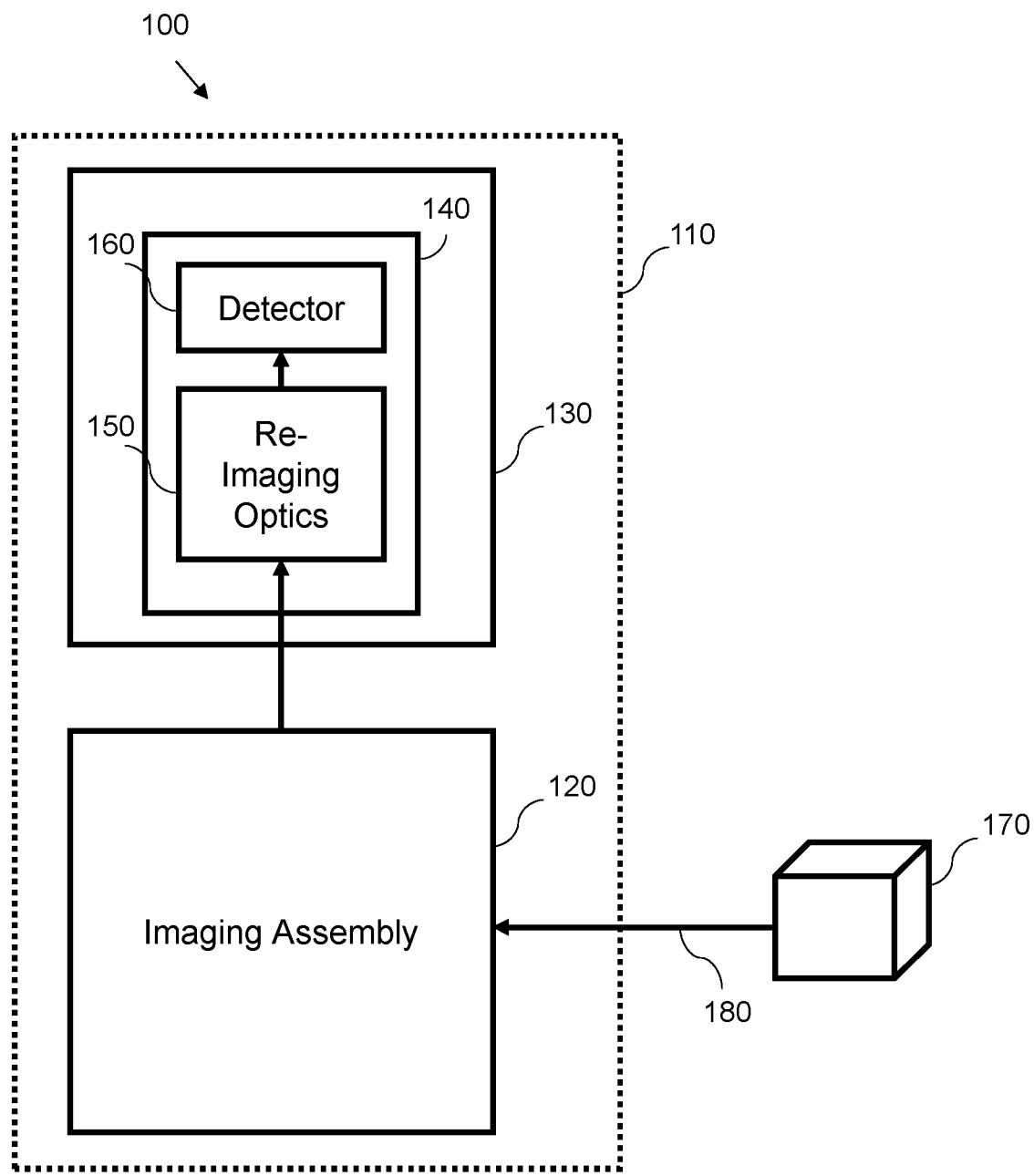
FIG. 1 is a schematic illustration of a terahertz imaging system according to an example.

FIG. 1 shows an example 100 of a terrestrial terahertz imaging system 110. The terrestrial terahertz imaging system 110 comprises an imaging assembly 120 and a receiver assembly 130. The imaging assembly 120 is configured to receive electromagnetic radiation in a terahertz band of frequencies (i.e. "terahertz radiation") and to direct this electromagnetic radiation into the receiver assembly 130. The imaging assembly 120 comprises optical components to receive electromagnetic radiation and generate a first image of a target object for use by the receiver assembly 130. For example, the first image of a target object may be generated before, after, at or near to an entrance aperture of the receiver assembly 130. The receiver assembly 130 comprises a number of components to capture the electromagnetic radiation. These components comprise a cryostat 140, which in turn contains a set of re-imaging optics 150 and a detector 160. The receiver assembly 130 comprises a set of optical and detection components arranged to use the first image of the target object generated by the imaging assembly 120 to generate a second image on the detector 160 and employs an electronic read-out that may be used to construct a digital image that is representative of the terahertz radiation field reflected and/or emitted by the target object.

In the example 100 of FIG. 1, the terrestrial terahertz imaging system 110 is configured to image at least a portion of an object 170 using terahertz radiation 180. The object emits and/or reflects terahertz radiation 180, which is received at the imaging assembly 120. The imaging assembly 120 is configured to form a first image of the object (or a portion thereof). In one case, this first image is formed between the imaging assembly 120 and the re-imaging optics 150. The re-imaging optics 150 receive the terahertz radiation from the imaging assembly 120 and form a second image of the object (or a portion thereof) on the detector 160. The imaging assembly 120 is thus arranged to allow terahertz radiation to enter the cryostat 140 and reach the re-imaging optics 150, and the re-imaging optics 150 is arranged to take the received terahertz radiation and re-image in such that a suitable image may be captured using the detector 160. The example 100 shown in FIG. 1 provides an efficient way to generate an image of an object using terahertz radiation. For example, the modular design of the imaging assembly 120 and the receiver assembly 130 allows these to be provided separately yet co-designed as interacting components. The image generated by the imaging assembly 120 may be considered a form of optical interface that couples the imaging assembly 120 and the receiver assembly 130.

In one case, the detector 160 is a superconducting detector. The detector 160 thus needs to be housed inside the cryostat 140 to maintain a temperature below an ambient temperature. In one case, the detector 160 may comprise a kinetic inductance detector. In another case, the detector 160 may comprise a bolometer, such as a Neutron Transmutation Doped Germanium sensor, or another form of thermal sensor. The cryostat 140 may maintain the detector 160 at temperatures below freezing point. In one case, the cryostat 140 may maintain the detector at temperatures below 1 Kelvin (optionally on a continuous basis). The term "cryostat" is used as per the art to refer to an apparatus for maintaining a low temperature, e.g. a cooled chamber where the temperature range is in the order of 0.1 to 10 Kelvin.

In certain examples, the imaging assembly 120 and the re-imaging optics 150 both comprise reflective optical systems. In certain cases, the optical components of the terrestrial terahertz imaging system 110 are all reflective. This can improve imaging by reducing the signal losses that are found due to absorption with refractive components.

In FIG. 1, the re-imaging optics 150 are "cold", i.e. they are within the cryostat and are maintained at similar temperatures to the detector 160. This presents certain challenges. The imaging assembly 120 is arranged to focus the electromagnetic radiation such that it may enter the receiver assembly 130 and the cryostat 140. In certain cases, the receiver assembly 130 and the cryostat 140 comprise an aperture to receive the electromagnetic radiation from the imaging assembly 120. The aperture for the receiver assembly 130 may be around 50 mm to 300 mm depending on the implementation. The imaging assembly 120 may also comprise an aperture or entrance pupil to receive the electromagnetic radiation. The aperture for the imaging assembly 120 may be between 200 mm and 800 mm in diameter.

In certain examples, the imaging assembly 120 comprises reflective optical components arranged in a confocal configuration that is arranged to image at finite conjugates. Here "confocal" refers to the property that the optical components have a common focus. The ability to image at finite conjugates may distinguish the optical components from comparative arrangements in a telescope, where the subject focal plane is at infinity. The imaging assembly 120 is thus configured in a manner closer to macro photography but using optical components that are not used within traditional macro photography. In one case, the confocal configuration is optimised to image at finite conjugates. For example, a typical imaging range may be defined based on a terrestrial use of the terahertz imaging system 110, e.g. the system may be placed to image objects at a preferred distance (such as 7-8 m for a body scanner), and the confocal configuration may be optimised for those distances.

In certain examples, the re-imaging optics 150 comprise a reflective, confocal optical relay. The optical relay may re-image, within the cryostat 140, electromagnetic radiation received from the imaging assembly 120, so as to form an image on the detector 160 (e.g. take a first image at a point between the imaging and receiver assemblies and re-image it as a second image on the detector). The optical relay may reverse an imaging direction to reduce a size of the receiver assembly 130 despite a relatively large field of view. The optical relay may comprise a confocal arrangement of one or more ellipsoid mirrors and a hyperboloid reflective cold stop. The reflective cold stop may help reduce noise, e.g. may limit background radiation and so improve the quality of the images produced by the system. Note that in this case, the re-imaging optics 150 are non-spherical and so differ from an Offner relay configuration where spherical components are used. The confocal arrangement of ellipsoids and hyperboloid provides improved wide-field imaging performance at expected terrestrial target ranges (e.g. 3 m to infinity). In certain cases, the parameters of the one or more ellipsoid mirrors and a hyperboloid reflective cold stop may be optimised for a desired target range (e.g. depending on application). The re-imaging optics 150 allow the receiver assembly 130 to be compact and also allows for a smaller cryostat, which can reduce demands for cooling the components inside the cryostat (e.g. the re-imaging optics 150 may fill a cubic volume of around 0.4 m width).

Figure 2A:
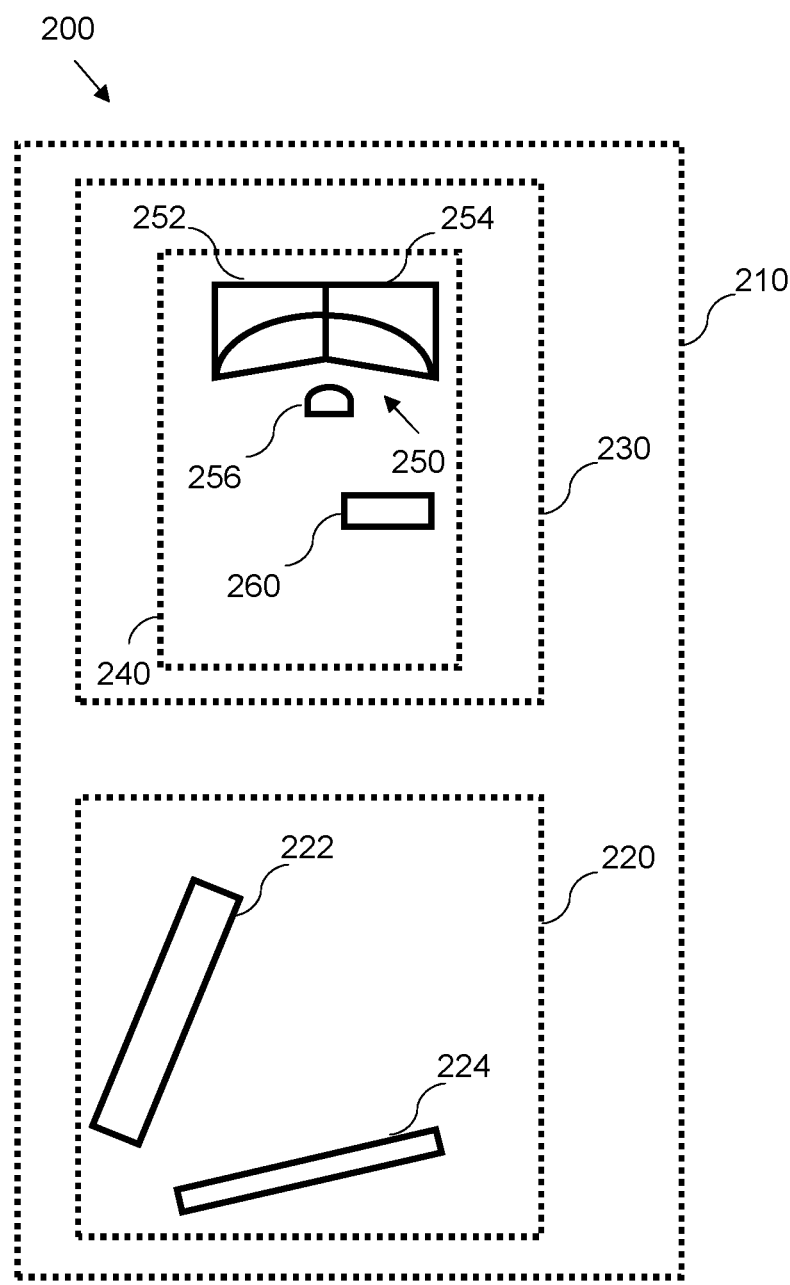
FIGS. 2A and 2B are schematic illustrations showing optical components of an example terahertz imaging system.
Figure 2B:
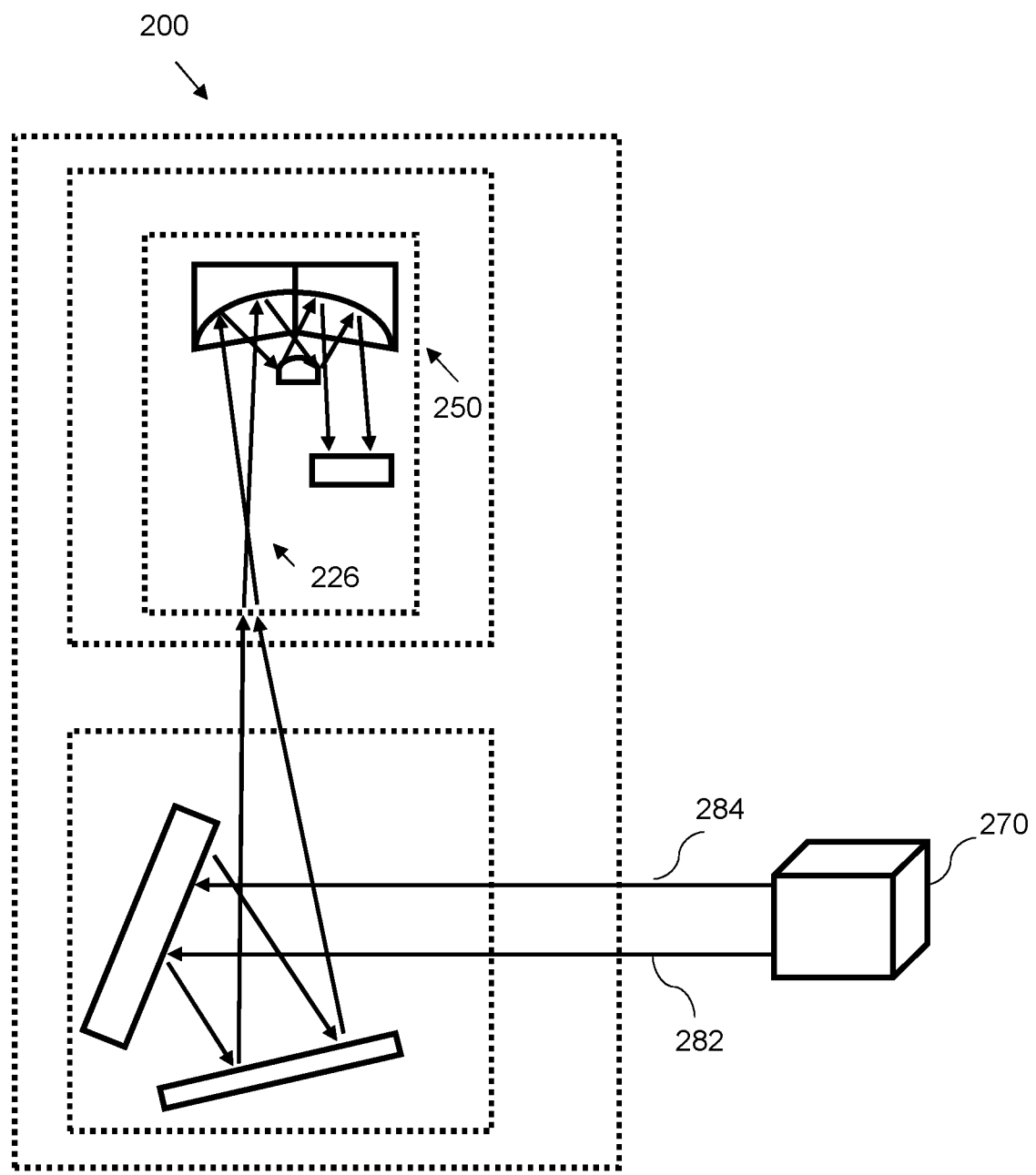

FIGS. 2A and 2B show a second example 200 of a terrestrial terahertz imaging system 210. As per FIG. 1, the terrestrial terahertz imaging system 210 comprises an imaging assembly 220 and a receiver assembly 230. The receiver assembly 230 in turn comprises a cryostat 240 with re-imaging optics 250 and a detector 260. The second example 200 shows certain internal components that may be used to implement the imaging assembly 220 and the re-imaging optics 250.

Beginning with the imaging assembly 220, FIG. 2A shows an example wherein the imaging assembly 220 comprises a first paraboloid mirror 222 and a second hyperboloid mirror 224. As shown schematically in FIG. 2B, the first paraboloid mirror 222 is configured to receive terahertz radiation from at least a portion of an object 270 to be imaged. FIG. 2B shows for illustration two rays of terahertz radiation 282, 284 that are received by the first paraboloid mirror 222 and directed towards the second hyperboloid mirror 224. The second hyperboloid mirror 224 is then configured to direct the electromagnetic radiation into the receiver assembly 230. In the example of FIGS. 2A and 2B, the first paraboloid mirror 222 and the second hyperboloid mirror 224 are confocal and reflective, e.g. they are both arranged to focus electromagnetic radiation towards a first focal point that is shown as 226 in FIG. 2B. This allows the electromagnetic radiation to be directed into the receiver assembly 230 and the cryostat 240. Although paraboloid and hyperboloid mirrors are described in this example, in other examples other mirror configurations may be used to provide the same optical functions.

Returning to FIG. 2A, the re-imaging optics 250 comprise a first ellipsoid mirror 252, a second ellipsoid mirror 254 and a hyperboloid reflective cold stop 256. As shown in FIG. 2B, the first ellipsoid mirror 252 receives electromagnetic radiation from the second hyperboloid mirror 224 and directs this towards the hyperboloid reflective cold stop 256. The hyperboloid reflective cold stop 256 then reflects the electromagnetic radiation towards the second ellipsoid mirror 254. The hyperboloid reflective cold stop 256 acts to limit background radiation by limiting received and reflected electromagnetic radiation to a particular cone-shaped field. The second ellipsoid mirror 254 receives reflected electromagnetic radiation from the hyperboloid reflective cold stop 256 and focuses it towards the detector 260. Although ellipsoid and hyperboloid mirrors are described in this example, in other examples other mirror configurations may be used to provide the same optical functions.

In certain examples described herein, the detector (e.g. 160, 260) is a superconducting detector. To allow for superconductivity, the detector may be maintained within the cryostat at temperatures below 1 Kelvin (optionally on a continuous basis). In certain cases, the detector is a superconducting detector array, e.g. a length of detecting elements where each element may form a picture element or pixel of a resulting image. In certain cases, for terahertz imaging, the detector array may have a length greater than 140 mm in at least one dimension. In certain cases, the detector is a superconducting kinetic inductance detector array. For example, the detector may comprise a lumped element kinetic inductance detector array. Lumped element kinetic inductance detectors are described in the paper "Lumped Element Kinetic Inductance Detectors" by Simon Doyle et al. published in the Journal of Low Temperature Physics 151.1-2 (2008), pages 530-536. As described in the paper, lumped element kinetic inductance detectors have proven benefits for performing terahertz imaging in astronomy, and they have also been found to provide these imaging benefits in terrestrial applications. Lumped element kinetic inductance detectors may provide a practical detector implementation that allows for high-quality images in a real-world context (e.g. outside of a laboratory and/or implementations in the upper atmosphere or space). A detector array may have hundreds or thousands of detector elements that may be read to construct pixels of a resulting image (e.g. in one case a 10,000 element detector array may be used to potentially provide 10,000 pixels in a row or column of a resulting image). Although one dimensional arrays are discussed herein, two dimensional arrays may also be used with suitable adaptations to the scanning systems. Reference to "imaging" herein, includes both one and two-dimensional images. It should also be noted that two-dimensional images may be flattened into one-dimensional arrays. Although reference is generally made to a one-dimensional detector array and a fixed field of view in one dimension, it should be noted that two-dimensional detector arrays may also be used with the examples described herein to obtain fixed fields of view in orthogonal directions. In this case, scanning elements may be replaced by fixed imaging components.

The detector may be packaged to provide shielding from interfering electromagnetic radiation and magnetic fields. For example, the detector may be packaged within conductive packaging that may act as a Faraday cage to provide electromagnetic shielding to improve image quality and prevent interference. Additionally, magnetic shielding may be employed to reduce susceptibility to external magnetic field variations. In one case, the detector packaging may form part of a feedhorn, i.e. a structure that optically couples the detector to the optical components. The feedhorn may also be constructed to provide said electromagnetic shielding. Aluminium may be used as a suitable conductive material to use to construct packaging and/or feedhorn structures. At one set of operating temperatures for the cryostat, namely temperatures of below 1K, aluminium is superconducting. This can provide benefits with regard to the electromagnetic shielding as compared to other conducting materials. In certain cases, the feedhorn, re-imaging optics and detector may be provided as a removable package, e.g. that may be removably mounted within the cryostat. The components of the removable package may also be dissembled such that one or more of the feedhorn, re-imaging optics and detector may be repaired and/or replaced.

The detector may also comprise an absorber layer on the rear. This may be provided instead of, in addition to, or as part of the packaging described above. This may also be formed from aluminium, e.g. in the form of an aluminium film. The absorber layer may help suppress straylight to improve imaging quality. The rear absorber layer may help to counteract the deleterious effect of unwanted photons and/or phonons.

FIGS. 1, 2A and 2B are schematic illustrations used to demonstrate the optical configurations of example terrestrial terahertz imaging systems. Certain components have been omitted for clarity and variations to these configurations are possible. For example, in one case, the optical path may comprise one or more metamaterial optical filters to reject short-wave infrared radiation and to define the spectral bandpass. (Preferably, optical components may comprise or be coated with an anti-reflection coating to help optimise signal gathering efficiency. There may be optical or quasi-optical filters at different locations corresponding to different temperature stages within the terrestrial terahertz imaging systems and/or within the cryostat. The cryostat may comprise one or more of a commercial pulse-tube cooler and a sub-Kelvin cooler. More details of a suitable cryostat may be found in the paper "A continuous dry 300 mK cooler for THz sensing applications" by Klemenic et al. published in the Review of Scientific Instruments in 2016. Cooling may be continuous.

Figure 3A:
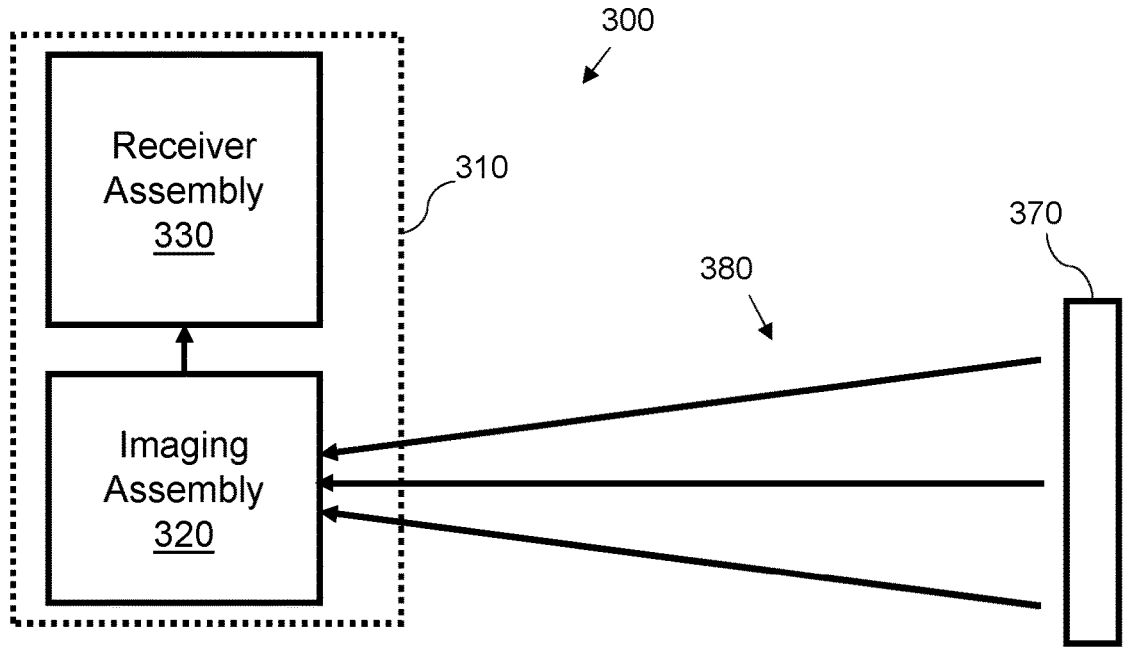
FIG. 3A is a schematic illustration showing a first example configuration for a terahertz imaging system.
Figure 3B:
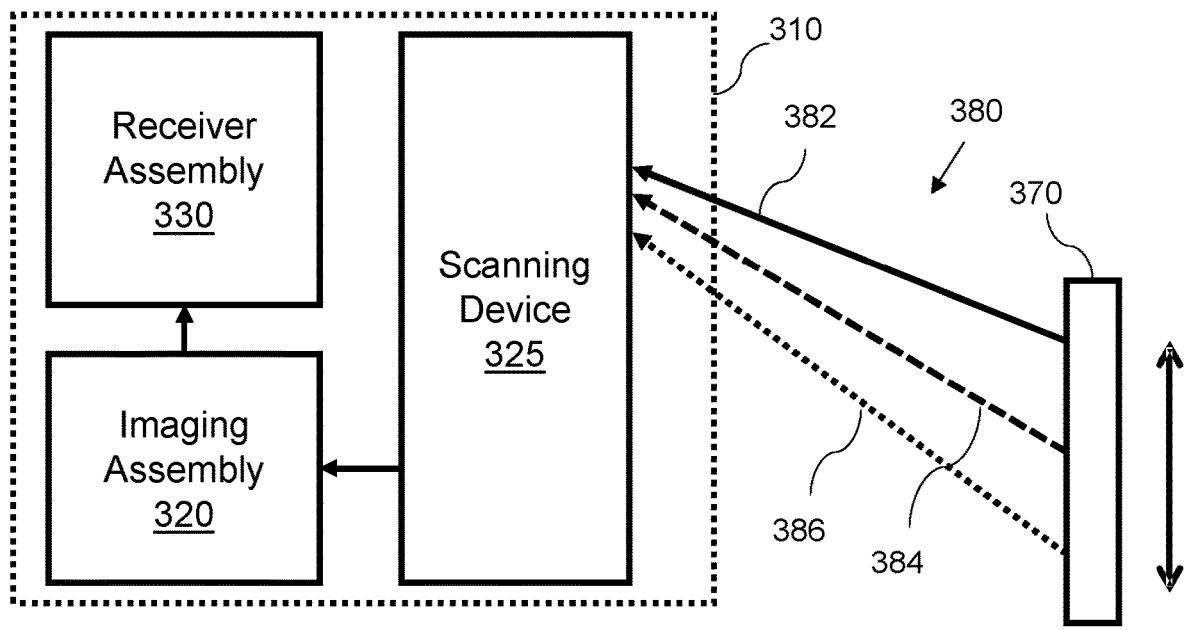
FIG. 3B is a schematic illustration showing a second example configuration for a terahertz imaging system.
Figure 3C:
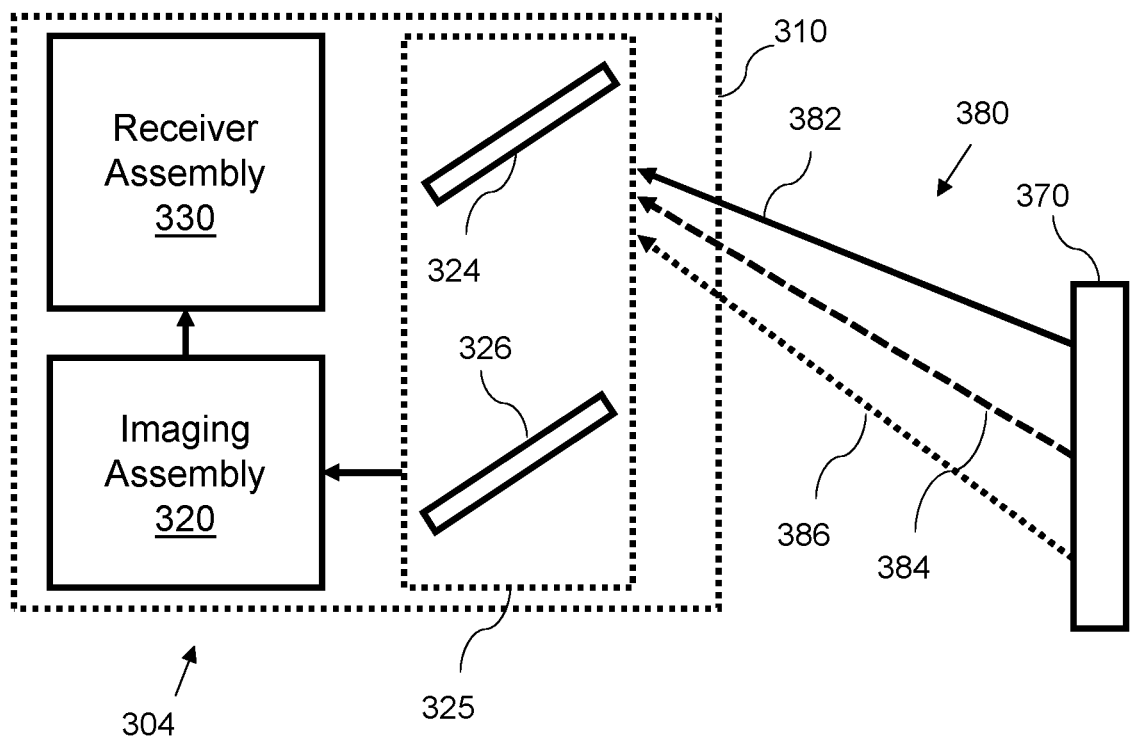
FIG. 3C is a schematic illustration showing optical components that are used for the second example configuration.
Figure 3D:
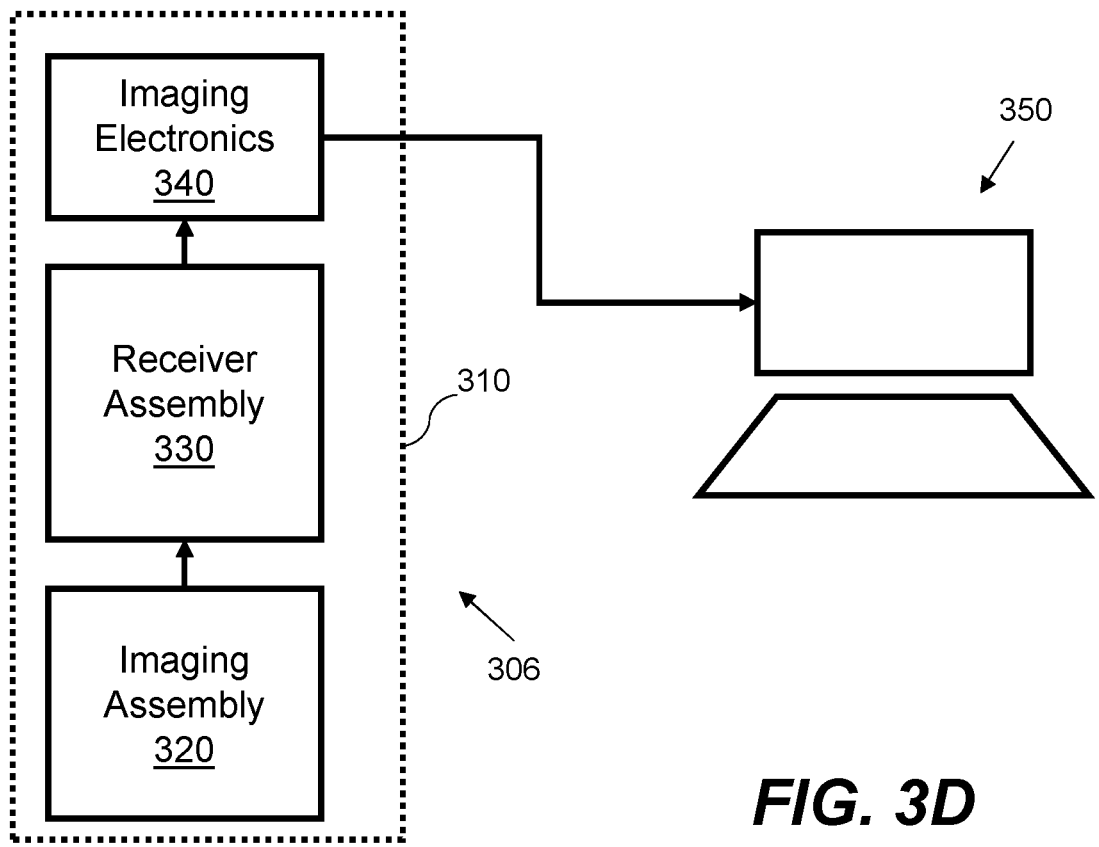
FIG. 3D is a schematic illustration showing imaging electronics that may be used with the first and second example configurations.

FIGS. 3A to 3D show a number of different configuration options for example terrestrial terahertz imaging systems. FIG. 3A shows a first configuration that may be used to image a defined vertical field of view, where a two-dimensional image may be constructed by providing relative scanning orthogonal to this field of view. FIG. 3B shows a second configuration that may be used to image a defined horizontal field of view, wherein a two-dimensional image may be constructed by providing relative scanning orthogonal to this field of view. An example configuration to provide relative scanning for the example for FIG. 3B is shown in FIG. 3C. FIG. 3D then shows how both configurations may be used to generate an image output for display, storage and/or transmission. Although the terms horizontal and vertical are used in these examples, it should be understood that these may comprise any two orthogonal directions in other examples.

FIG. 3A shows a first configuration 300 of a terrestrial terahertz imaging system 310 that comprises an imaging assembly 320 and a receiver assembly 330. The terrestrial terahertz imaging system 310 may be configured in a similar manner to the terrestrial terahertz imaging systems 110 and 210 in the previous Figures. The terrestrial terahertz imaging system 310 is configured to image an object 370 using a fixed field of view, as illustrated by rays 380. The fixed field of view may be a substantially vertical field of view that covers an extent of an object of interest to image. In this case, the extent of the object as indicated by the rays 380 may be imaged onto a detector comprising a detector array within the receiver assembly 330. The detector array may be a one-dimensional detector array comprising a plurality of detector elements to capture terahertz radiation from different locations within the fixed field of view. Thus, the fixed field of view may also comprise a one-dimensional field of view.

In use, relative scanning motion between the object 370 and the terrestrial terahertz imaging system 310 may be introduced. This may comprise moving the object 370 orthogonally to the field of view as illustrated by rays 380 and/or moving the terrestrial terahertz imaging system 310 in a similar direction.

In one case, the first configuration 300 may be used to implement a terahertz vehicle imaging device. In this case, the imaging assembly 320 comprises first imaging optics to receive terahertz radiation from a vehicle of interest. The cryostat of the receiver assembly 330 contains second imaging optics and a terahertz radiation detector array, the second imaging optics being configured to form at least a one-dimensional image on the terahertz radiation detector array. The second imaging optics may comprise the re-imaging optics 150, 250 of the previous Figures. In use, the first imaging optics are configured to direct the terahertz radiation into the receiver assembly 330. The first and second imaging optics have an instantaneous vertical field of view that encompasses a height of the vehicle of interest. For example, the field of view may be a fixed vertical field of view of around 2-3 m. This may capture an extent of a car, van or truck passing by the terrestrial terahertz imaging system 310. The terrestrial terahertz imaging system 310 may then generate an image of the vehicle of interest following relative movement of the vehicle of interest with respect to the terrestrial terahertz imaging system 310. For example, the terrestrial terahertz imaging system 310 may be statically located, e.g. at the side of the road or in a customs check-point, and an image may be generated as the vehicle drives past the terrestrial terahertz imaging system 310. Due to the capture of terahertz radiation, the image may show the contents of the vehicle. For example, the terrestrial terahertz imaging system 310 may capture terahertz radiation that is emitted and/or reflected from within the vehicle, such that the image may show the contents of a vehicle interior that are not visible from the outside. In certain examples, the terrestrial terahertz imaging system 310 may be located around 5 to 20 m away from a passing vehicle to perform the scan. The terrestrial terahertz imaging system 310 may thus be used to detect people or animals being illegally smuggled within a vehicle.

FIG. 3B shows a second configuration 302 of a terrestrial terahertz imaging system 310 that differs from the first configuration 302. The second configuration 302 is arranged to have a fixed field of view that is orthogonal to the fixed field of view of the first configuration 300. This may be achieved by rotating the receiver assembly 330 by 90 degrees. In this case, the fixed field of view may comprise a substantially horizontal field of view (e.g. into the paper in FIG. 3B). The second configuration 302 is thus configured to capture an extent of the object 370 in a direction orthogonal to the first configuration 300. This may be a width of the object 370.

In order to generate a two-dimensional image of the object 370, the second configuration 302 comprises a scanning device 325 to scan the field of view and direct the received electromagnetic radiation into the imaging assembly 320. The scanning device 325 may be configured to scan a fixed substantial horizontal field of view in an orthogonal, i.e. substantially vertical, direction. This is illustrated by the arrow to the right of the object 370. During the scan electromagnetic radiation, as illustrated by rays 380, is received from different portions of the object 370, e.g. as illustrated by sequential rays 382, 384 and 386. In one example, a fixed horizontal field of view may be around 6 degrees, allowing a 1 m horizontal field to be imaged at an approximately 10 m range from the system entrance pupil, or around 7.5 m range from the scanning device aperture.

In one case, the second configuration 302 may be used to implement a terahertz body scanning device. For example, a field of view of approximately 1 m at 10 m distance allows a width of a person to be captured. The scanning device 325 may then be configured to scan up and down a person to capture a full image. In this case, the scanning device 325 comprises scanning optics to scan at least a portion of a person of interest. The scanning optics and imaging optics within the receiver assembly 330 (e.g. re-imaging optics 150, 250) may have a horizontal field of view that encompasses a width of the person of interest.

FIG. 3C shows a third configuration 304 where the scanning device 325 of FIG. 3B comprises a periscope scanner. Other components may be arranged as per FIG. 3B. The periscope scanner 325 comprises a pair of flat scanning mirrors 324, 326 to receive the electromagnetic radiation from the object 370 (e.g. as illustrated by rays 380) and to direct it to the imaging assembly 320. A first flat mirror 324 in the pair receives terahertz radiation from the object 370 and directs it to a second flat mirror 326, which then directs the same radiation into the imaging assembly 320. The pair of flat scanning mirrors 324, 326 may operate in anti-phase, as one mirror rotates by an angle +θ (measured in the plane of FIG. 3C), the second mirror rotates by a corresponding angle −θ. The periscope scanner 325 thus enables a range orthogonal to the field of view to be scanned, e.g. to vertically scan a person of interest in a body scanning device.

FIG. 3D shows a fourth configuration 306 that demonstrates the coupling of imaging electronics 340 to the receiver assembly 330 within the terrestrial terahertz imaging system 310. The imaging electronics 340 may be used with any of the previously described examples. Although shown as separate from the receiver assembly 330 in FIG. 3D, in other cases, the imaging electronics 340 may comprise portions inside and outside the cryostat. It is preferred to have a majority of the imaging electronics 340 outside the cryostat to reduce cost and complexity. The imaging electronics 340 receive a signal from a detector inside the receiver assembly 330, such as a one-dimensional detector array that is arranged to image the fixed field of view. In both the first and second configurations 302, 304, the imaging electronics 340 may receive signals from the aforementioned detector array and construct a two-dimensional image during scanning in the direction orthogonal to the fixed field of view (e.g. in a scanned, orthogonal field of view). The imaging electronics 340 may thus be configured to generate an image as the fixed field of view is scanned over time (e.g. either actively or passively).

In the case of a terahertz vehicle imaging device, e.g. using the first configuration 302 of FIG. 3A, the imaging electronics 340 may generate an image of a vehicle of interest using signals read from a detector array which may then be viewed on a display device 350. In the case of a terahertz body scanning device, the imaging electronics 340 may generate an image of a person of interest using signals read from the detector array. The display device 350 may display an image for analysis, e.g. by security personnel, or comprise a computing device for storage, transmission or further analysis. In one example, the image generated by the imaging electronics 340 may be fed to one or more machine learning devices for automated analysis. For example, the image generated by the imaging electronics 340 may be fed to one or more convolutional neural networks that are trained on labelled images. The labelled images may indicate particular items to detect, such as different threats or weapons.

In certain examples that desire a fixed field of view of around 6 degrees in at least one direction, a detector array may be provided with a length of around 140 to 160 mm in a corresponding direction (e.g. to image the fixed field of view). In these cases, the detector array may have a width of around 20-30 mm. In certain cases, a length greater than 160 mm may be used to increase the fixed field of view. In test optical configurations, lengths of up to 180 mm are possible. Greater detector array lengths may be implemented with suitable adjustments to the optical configurations. In certain examples, the detector array may be positioned such that rays or beams of terahertz radiation hit the centre of the array at an angle close or equal to the normal of the detector plane. At the limits of the fixed field of view, the maximum deviation from this normal may be around 2-3 degrees.

Figure 4:
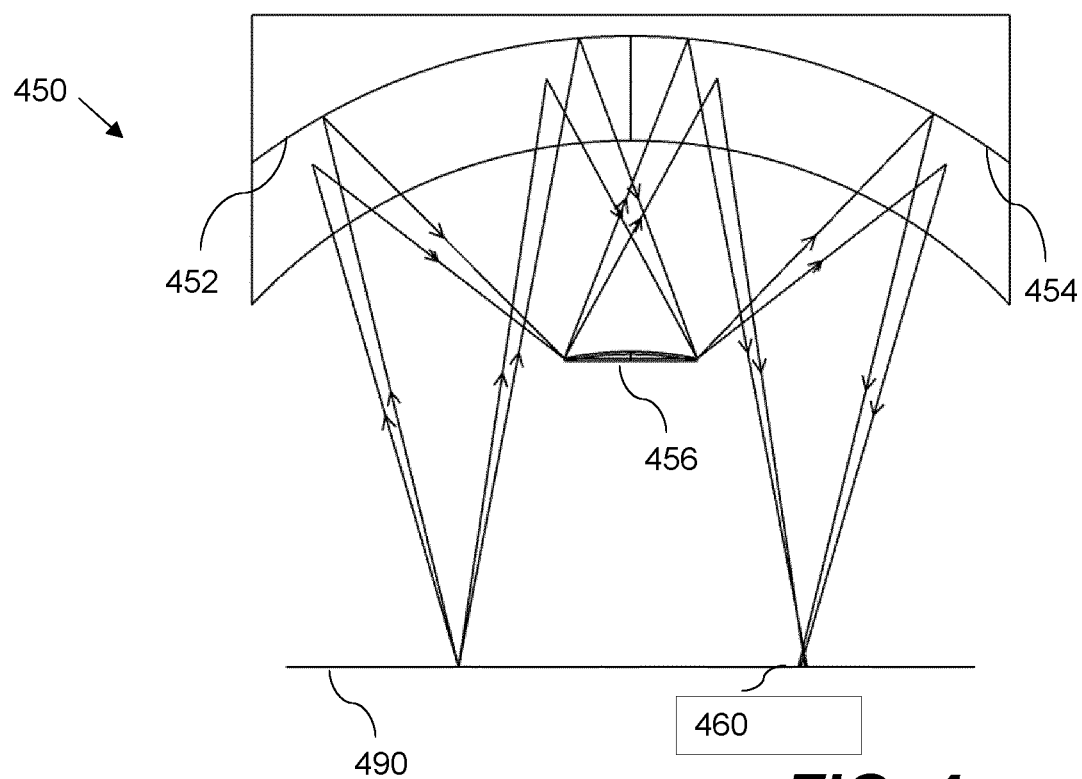
FIG. 4 is a schematic illustration showing optical components for cold re-imaging within an example terahertz imaging system.

FIG. 4 shows, in more detail, an example set of re-imaging optics 450 that may be used to implement the re-imaging optics 150, 250 in FIGS. 1, 2A and 2B.

Similar to FIGS. 2A and 2B, FIG. 4 shows a set of re-imaging optics 450 for mounting within a cryostat of a receiver assembly that comprise a first ellipsoid mirror 452, a second ellipsoid mirror 454 and a hyperboloid reflective cold stop 456. The re-imaging optics 450 of FIG. 4 direct received terahertz radiation towards a detector 460, which in this example comprises a detector array. The first and second ellipsoid mirrors 452, 454 and the hyperboloid reflective cold stop 456 may be configured as per the example of FIG. 2A.

In FIG. 4, a beam of terahertz radiation enters the receiving assembly (e.g. as described with reference to the previous Figures) and an image of an entrance pupil or aperture is formed by the first ellipsoid mirror 452 on the hyperboloid reflective cold stop 456. This may be an image of an entrance pupil for an imaging assembly, e.g. an entry point for electromagnetic radiation entering the terrestrial imaging system. The hyperboloid reflective cold stop 456 then reflects the beam towards the second ellipsoid mirror 454. The second ellipsoid mirror 454 may be an identical copy of the first ellipsoid mirror 452 (e.g. for ease in manufacture) or may comprise a different ellipsoid mirror configuration depending on the location of the detector 460 and any redirecting mirrors. The second ellipsoid mirror 454 forms an image of a primary focus 490, which may comprise an image generate by the imaging assembly of the previous examples, at the detector 460. The re-imaging optics 450 are all "cold" optics as they are mounted within the cryostat and are also all reflective. It should be noted that the first ellipsoid mirror 452, the second ellipsoid mirror 454 and the hyperboloid reflective cold stop 456 are not spherical, as may be found in a comparative Offner relay. Instead, they form a confocal arrangement of ellipsoids and a hyperboloid. These mirrors may be optimised to provide good overall imaging performance over the large extent of the primary image plane, due to the wide field of view, in a compact configuration. Certain cold components of the re-imaging optics 450 may be manufactured using a Computer Numerical Control (CNC) lathe. Using the optic components of this example, and of other examples, provides a set of re-imaging optics that may operate at the "cold" temperatures inside the cryostat that are required by the detector 460 with good imaging properties.

Figure 5:
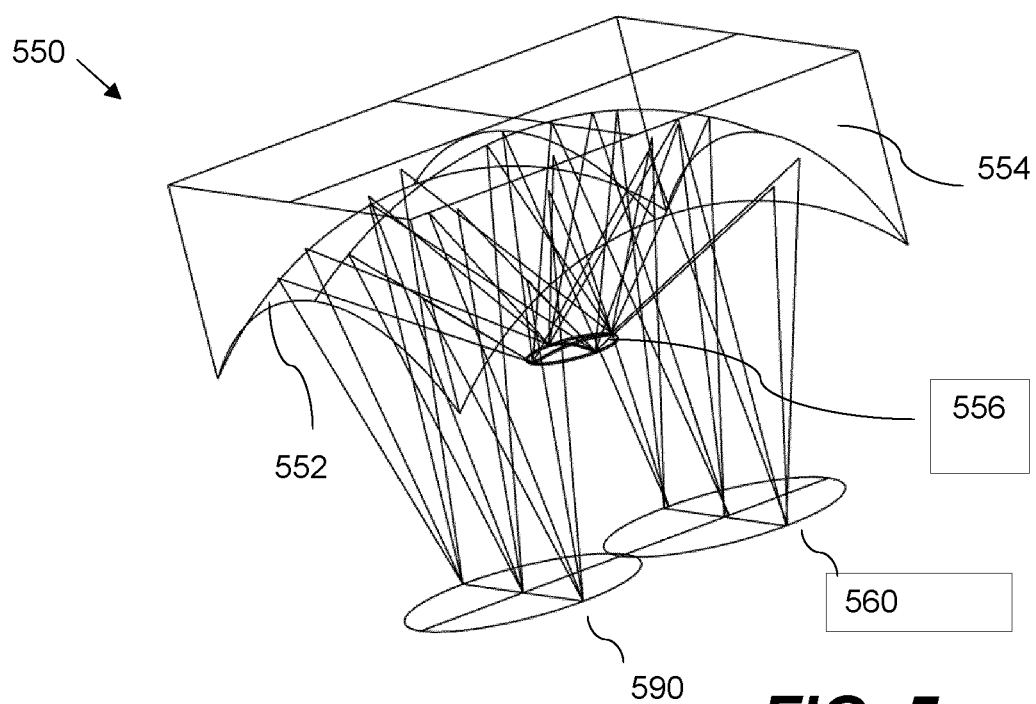
FIG. 5 is a perspective view showing example cold re-imaging optical components.

FIG. 5 shows a perspective view of an example set of re-imaging optics 550. FIG. 5 may be considered a perspective view of the re-imaging optics 450 of FIG. 4. FIG. 5 shows how a fixed horizontal extent of an image (e.g. as later shown in FIG. 7C) may be re-imaged from a primary focus 590 onto a detector 560 via a cold stop 556. First and second ellipsoid mirrors 552 and 554 are shown, similar to those in FIG. 4. In examples with a fixed vertical field of view, the image at the detector 560 may correspond to this extent as opposed to a fixed horizontal extent. In examples described herein, movement of a scanning device (e.g. such as the scanning device 325 of FIG. 3B) may change the image that is projected onto the detector 560, e.g. this image may change as a vertical extent of an object is scanned.

Figure 6:
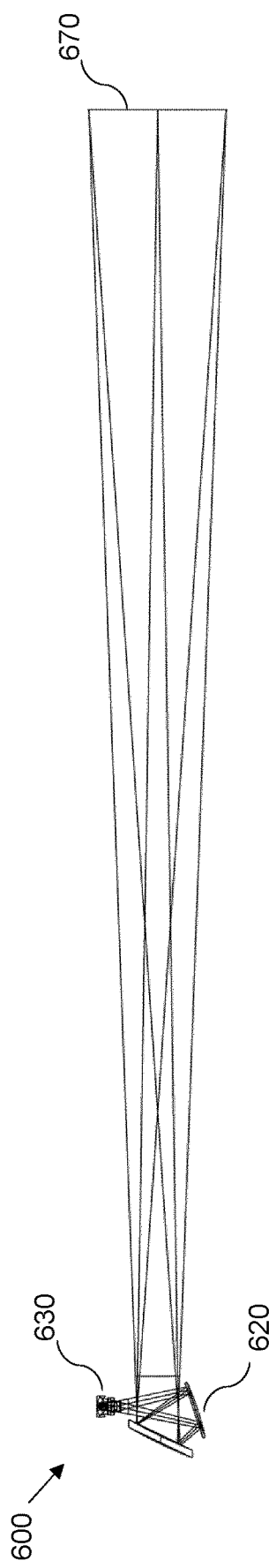
FIG. 6 is a schematic illustration showing a field of view for an example terahertz imaging system.

FIG. 6 shows an example of a terahertz vehicle imaging device 600. Vehicle may be taken widely; the imaging device 600 may be used to image cars, vans, trucks, ships, trains and aircraft, amongst others. The terahertz vehicle imaging device 600 comprises an imaging assembly 620 and a receiver assembly 630. These may be configured as per any one or combination of previous examples. For example, FIG. 6 may show an implementation of the first configuration 300 of the terrestrial terahertz imaging system of FIG. 3A. FIG. 6 shows an illustrative distance of an object 670 from the terahertz vehicle imaging device 600. FIG. 6 shows a side view of the terahertz vehicle imaging device 600 such that the shown extent of the object 670 may represent a substantially vertical height of a vehicle. FIG. 6 shows a series of ray bundles indicating how terahertz radiation may be received from different portions of the object 670. The observed vertical extent of the vehicle at one point in time may be a narrow, 1-dimensional "slice". In use, the portion of the object 670 shown in FIG. 6 may comprise a side of a van or lorry passing through a security checkpoint, and the extent of the object may be around 2-3 m. The width, breadth and height of the terahertz vehicle imaging device 600 may be around 1-2 m, with a total volume envelope of around 3 m³. In this case, and in other examples, the detector may comprise a detector array arranged to Nyquist sample an extent of the object, in this case in a substantially vertical direction. In other examples the detector array may be configured to Nyquist sample in an orthogonal direction to that shown in FIG. 6. The distance of the object 670 from the terahertz vehicle imaging device 600 may be around 10-20 m. The spatial resolution of imaging may be around 15 mm, depending on the distance to the object, the primary entrance pupil diameter of the system, and/or the selected imaging frequency. In the example of FIG. 6, the (fixed) field of view may be approximately 6 degrees vertically and 0.3 degrees horizontally. The effective horizontal field of view may then be increased by the relative scanning motion. The entrance pupil or aperture dimension for the imaging assembly 620 may be around 650 mm. Images may be generated at a rate of around 10 Hz in test implementations.

Figure 7A:
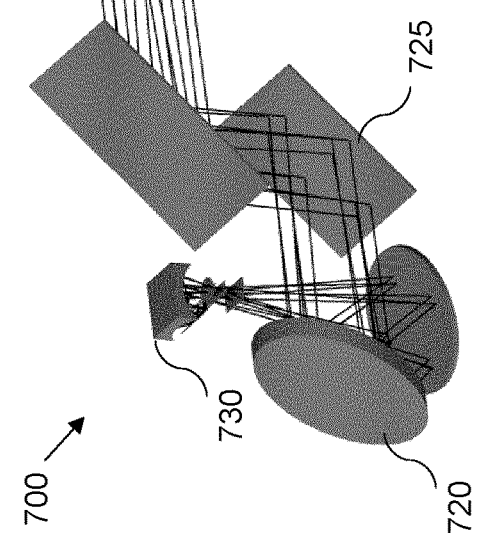
FIG. 7A is a three-dimensional perspective view of optical components for an example terahertz imaging system.

FIGS. 7A, 7B and 7C show different views of an example terahertz body scanning device 700 that may be implemented using the components of the previously described examples. For example, 7A, 7B and 7C may show an implementation of the second and/or third configurations 302, 304 of the terrestrial terahertz imaging system of FIGS. 3B and 3C. The terahertz body scanning device 700 may be used at an entrance point to a building or transport hub to image people entering the building or hub. In certain cases, the terahertz body scanning device 700 may form part of an airport security scanner or station. In these cases, the terahertz body scanning device 700 may be used to detected smuggled contraband and/or threats. For example, the terahertz body scanning device 700 may be used to detect weapons (guns and knives etc.) or explosives hidden under clothing or within baggage. As per the vehicle scanning example, images may be input into machine learning functions that automate detection of threats etc. and/or may be viewed by security personnel.

FIG. 7A shows a three-dimensional view of the optical components of the terahertz body scanning device 700. FIG. 7B shows a side view of the optical components of the terahertz body scanning device 700, e.g. a view parallel to a plane that contains the scanning direction. FIG. 7C shows a top view of the optical components of the terahertz body scanning device 700, e.g. representing a fixed extent of an object 770 to be imaged. The terahertz body scanning device 700 comprises an imaging assembly 720, a scanning device 725 and a receiver assembly 730. The terahertz body scanning device 700 is arranged to scan the object 770, which may comprise a portion of a human body, in direction 775 as shown in FIG. 7B. The instantaneous field of view of the terahertz body scanning device 700 is shown in FIG. 7C. The field of view may be 6 degrees in a direction across the object, e.g. as shown in FIG. 7C, and between 0 and 1 degrees in an orthogonal direction, i.e. the scanning direction of FIG. 7B.

In FIGS. 7A to 7C, a scanning device 725 comprising a periscope scanner is shown. This may be implemented in a similar manner to the scanning device 325 described in FIGS. 3B and 3C. For example, in FIGS. 7A to 7C, there are shown two mirrors that may be moved in anti-phase to perform a scanning motion. In other examples, with an adjusted positioning of the terahertz body scanning device 700, one of the scanning mirrors may be omitted. Different scanning positions are shown in FIG. 7B, wherein adjustment of the angles of the mirrors of the scanning device 725 change the portion of the object that is being scanned in direction 775, e.g. scans up and down a body.

In FIGS. 7A to 7C, the imaging assembly 720 comprises two mirrors arranged in a confocal configuration that is arranged to image at finite conjugates. This is in contrast to a comparative Dragone configuration where optical components are configure to image at infinite conjugates. These two mirrors may comprise a first paraboloid mirror and a second hyperboloid mirror as described with reference to FIGS. 2A and 2B. FIG. 7B shows multiple rays from different scanning locations on the object 770. FIGS. 7A and 7C show rays from an extent across the object 770, e.g. rays from across a width of a body. In FIG. 7C, the receiver assembly is positioned under the imaging assembly 720 and so has limited visibility in this Figure. The receiver assembly 730 in FIGS. 7A to 7C is arranged at a 90-degree angle to the receiver assembly 630 in FIG. 6, i.e. FIGS. 6 and 7B are the same side view.

As shown in FIG. 7B, rays of terahertz radiation (e.g. a beam) projected from a point on the object 770 are first folded by the first mirror in the scanning device 725 (i.e. the upper mirror in the Figure) and may be then directed to a second mirror in the scanning device 725 (i.e. the upper mirror in the Figure). From the second mirror, the rays enter the imaging assembly 720 and an image of the object 770 is formed at the output of the imaging assembly 720, which is near to an aperture or window of the receiver assembly 730. In certain cases, the image may be formed at the aperture or window; in other cases, the aperture or window of the receiver assembly 730 may be forward of the image plane to enable cold baffling, and to minimise the size of the aperture on the cold shield.

Although the examples of FIGS. 6 and 7A-7C are described with reference to vehicle and body scanning examples, it should be noted that other forms of imaging and security devices may implemented using the same teaching.

Imaging systems implemented in accordance with the example of 7A to 7C, may have an instantaneous fixed field of view (a "slice") of around 6 degrees in the horizontal plane, which may be imaged upon a linear array of Nyquist-sampled detector elements. In this example, the horizontal "slice" may be scanned in a vertical plane over a range up to +/−11°, to enable the imaging system to fully sample a 6° (horizontal)×22° (vertical) field. With a target object at 8 m range, and the aforementioned configuration, the example imaging system may scan a 1 m×2 m field with a vertical scan of +/−6°. In this case, an entrance pupil position, e.g. for the imaging assembly 720, may be around 700 mm behind the second mirror of the scanning device 725. In cases configured for optimal imaging at, say, a 7.5 m range, then a total distance from the object 770 to the entrance pupil of the imaging assembly 720 may be around 9.2 m. The entrance pupil of the imaging assembly 720 in this case may be around 650 mm. In certain examples, the field of view may be flexibly configured based on a geometry of a linear detector array and the optical components. For a body scanning application, one test configuration enabled a spatial resolution of 15 mm at a 7.5 m object range and at a wavelength of 850 µm; in this configuration an object at 3.75 m would provide 7.5 mm resolution with a reduced field of view. The spatial resolution in other examples may depend on a selected operating wavelength (or wavelengths), the entrance pupil diameter and the distance to a target object. Beam telecentricity on an example linear detector array may vary across the field of view—it may be near 0 degrees at the centre of the array and less than around 2.4 degrees from a normal of the array plane at the limits of the field of view. Although, an example target distance of 7.5 m is described with respect to the example of FIGS. 7A to 7C, it is possible to re-focus the imaging system on a target object at a range of 3 m from the first mirror of the scanning device 725 and still maintain good optical performance. For example, imaging of closer range targets may be performed to obtain increased spatial resolution.

Figure 8A:
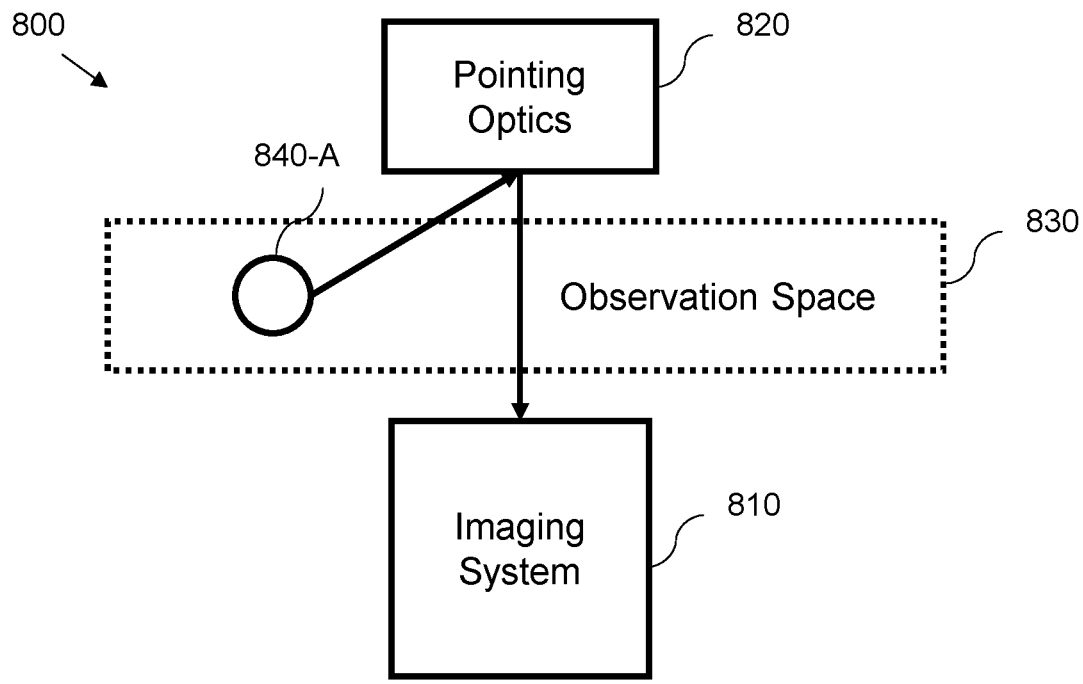
FIGS. 8A and 8B are schematic illustrations showing an example of object imaging within a defined observation space.
Figure 8B:
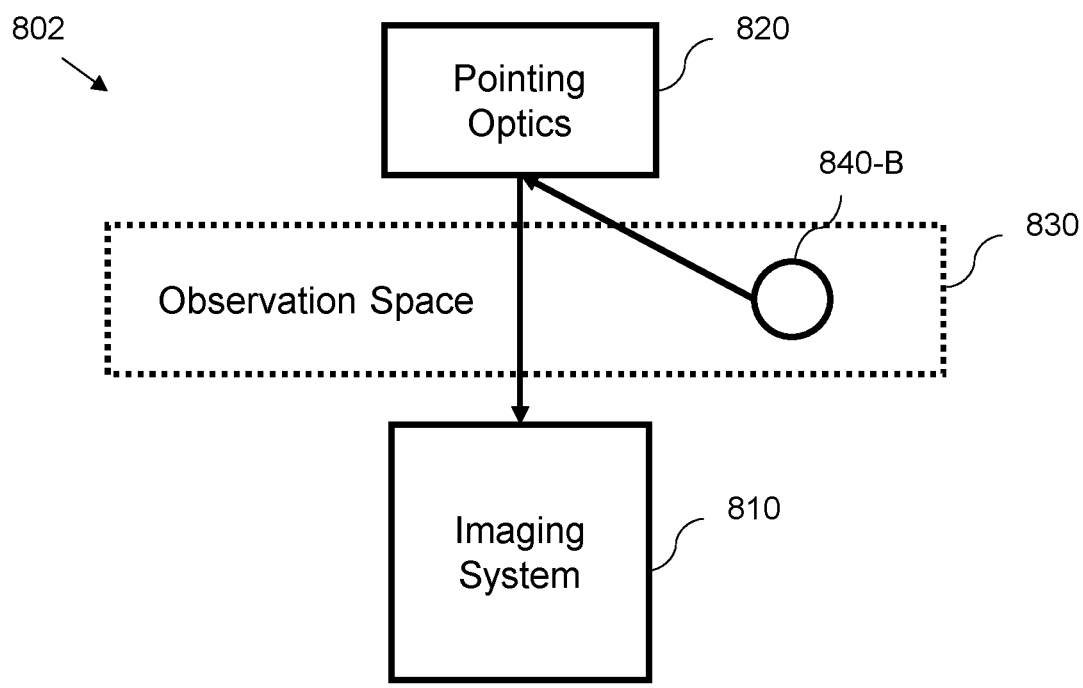

FIGS. 8A and 8B show an example of how the terrestrial terahertz imaging system of any of the previous examples may be configured to observe an object in motion within an observation space. In one case, the example of FIGS. 8A and 8B may be used, e.g., with the body scanning implementation described with reference to any one of FIGS. 3B, 3C, 7a, 7B and 7C, to image different views of a person as they walk along an observation corridor. Such an implementation may be used within transport hubs such as ports, airports and bus stations to scan passengers and may be used to avoid an explicit "stop-and-scan" security check.

FIG. 8A shows the example at a first point in time 800 and FIG. 8B shows the example at a second, subsequent, point in time 802. Both Figures show an imaging system 810, a set of pointing optics 820 and an observation space 830. In the Figures, an object 840 moves within the observations space 830 from a first position 840-A to a second position 840-B. The observation space 830 may comprise an observation corridor, e.g. a pedestrian corridor in a building or in an urban environment. The object 840 may be a person. The person may move from the first position 840-A to the second position 840-B over time, e.g. by walking or moving on a travellator. In other cases, the object 840 may comprise a moveable vehicle or a robotic device, or a static object that is moved by a conveyance system.

The imaging system 810 may comprise a terrestrial terahertz imaging system as described in the examples herein. In particular, the imaging system 810 may comprise a body scanning implementation, such as those shown in FIGS. 3B, 3C, 7A, 7B, and 7C. In other cases, the imaging system 810 may comprise a different implementation, e.g. the object 840 may comprise an article of manufacture, or luggage, on a conveyor belt.

The pointing optics 820 may comprise an external pointing mirror to direct terahertz radiation towards the imaging system 810 as the object 840 moves perpendicularly to an optical axis of the imaging system 810. The term "external" is used to indicate a presence outside the imaging system. In the present example, the observation space is aligned perpendicular to the optical axis of the imaging system 810 and the pointing optics 820 and the imaging system 810 are aligned either side of the observation space 830. The optical axis may relate to an input optical path for the scanning device or the imaging assembly of the previous examples. The optical axis is shown in FIGS. 8A and 8B along the arrow between the pointing optics 820 and the imaging system 810. Different configurations are possible for different uses and in other examples the pointing optics may form part of the imaging system 810. In a case where the object 840 is a person, a pointing mirror of the pointing optics 820 may be configured to direct terahertz radiation received from the person of interest to a scanning device of the imaging system.

In the present example, the pointing optics 820 are moveable so as to capture different views of the object 840 as it moves from the first position 840-A to the second position 840-B. Although two positions are shown in FIG. 8A and 8B the process of observation may be continuous and/or may comprise any number of discrete observation points. In the example of FIGS. 8A and 8B, the pointing optics 820 are used to capture a front view of the object 840 at the first position 840-A and a rear view of the object 840 at the second position 840-B as the object moves from left to right along the observation space 830. A pointing mirror of the pointing optics 820 may be moveable during a scanning operation to direct terahertz radiation received from the object 840 at different locations relative to the imaging system 810. In other examples, additional mirrors or other reflective surfaces may be used to allow for different angles of view.

Figure 9:
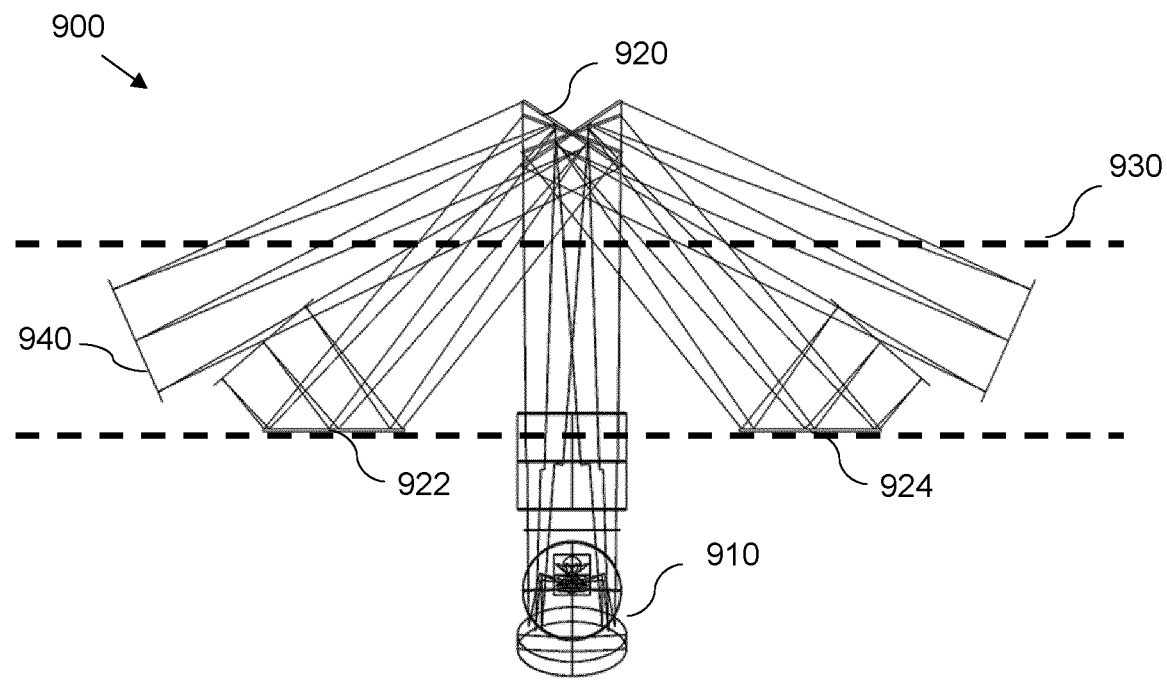
FIG. 9 is a schematic illustration showing four observations of a person within an example observation space.

FIG. 9 shows an example terahertz body scanning system 900 that is an implementation of the example of FIGS. 8A and 8B. In this example, the imaging system 910 comprises the terahertz body scanning device 700 of FIGS. 7A to 7C. FIG. 9 is a top view of the system and so components are visible that are similar to those shown in FIG. 7C, including components for a scanning device and an imaging assembly as described with reference to that Figure. In FIG. 9, the pointing optics comprise a pointing mirror 920, which is shown in FIG. 9 in four different configurations relating to four different mirror angles. The pointing mirror 920 may comprise a rotatable flat mirror positioned opposite the imaging system 910. The pointing mirror 920 may be rotated in a similar manner to the scanning devices described herein, e.g. by an electric motor or the like. As shown in FIG. 9, an observation space 930 comprises a corridor that a person 940 walks along (e.g. from left to right in this example although this direction may be reversed). The terahertz body scanning system 900 also comprises additional reflective surfaces 922 and 924 to reflect terahertz radiation. These may comprise flat mirrors or metal panels. These panels may be coated with thin plastic and graphics if required (e.g. as a portion of the side of the corridor). The additional reflective surfaces 922 and 924 allow an additional view of the person as compared to the example of FIGS. 8A and 8B.

In one implementation, for use in the terahertz body scanning system 900 of FIG. 9, the terahertz body scanning device 700 of FIGS. 7A to 7C may be focussed to a fixed target range of 7.5 m (from the first mirror of the scanning device 725). The observation space 930 may be a corridor of around 2 m in width. As a subject 940 walks along the observation space 930 they may be scanned from four different viewpoints, e.g. "SE, SW, NE, NW" in the reference frame of the Figure. The terahertz body scanning device 700 of FIGS. 7A to 7C, and in particular the first mirror of the scanning device 725, is fed by the pointing mirror 920. This pointing mirror 920 directs a vertically scanning beam (e.g. as scanned by the terahertz body scanning device 700) to four different fixed positions, each of which either view the subject 940 directly, or via the additional reflective surfaces 922 and 924. In certain cases, the observation space 930, as a corridor, may have polypropylene "windows" where the beam of terahertz radiation needs to penetrate, e.g. to access the imaging system 910 and/or to access the additional reflective surfaces 922 and 924 if these are mounted behind the "walls" of the corridor. These polypropylene "windows" can be optically opaque, e.g. they could carry an image of an airport or tropical destinations. In one case, the positions of the pointing mirror 920 may be triggered by the subject 940 breaking different light beams as they traverse the observation space 930. Using the example specifications of the terahertz body scanning device 700 of FIGS. 7A to 7C, the terahertz body scanning system 900 of FIG. 9 may allow a 2 m (high) by 1 m (wide) subject 940 to be imaged from four different angles, with a spatial resolution of around 15 mm.

Figure 10:
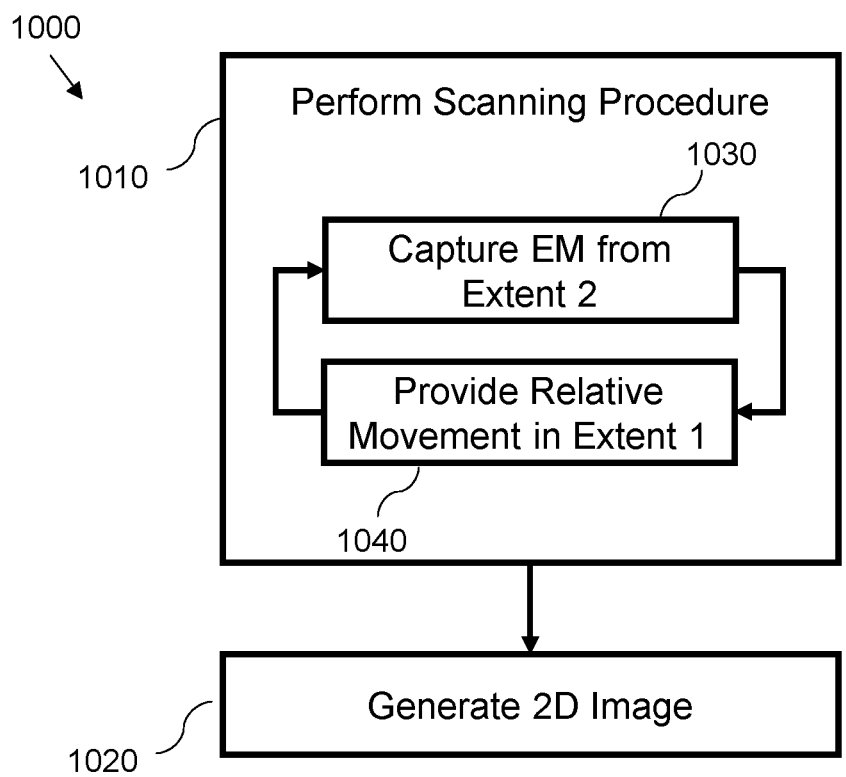
FIG. 10 is a flow diagram showing a method of terahertz imaging according to an example.

FIG. 10 shows a method 1000 of scanning an object using a terrestrial terahertz imaging system. The method may be applied using any of the previous imaging system examples. The method comprises two operations 1010 and 1020. At a first block 1010, the method 1000 comprises performing a scanning procedure. The scanning procedure involves scanning a first extent of an object in a first direction. In cases where the object is a person of interest, the first extent may comprise a height of the person of interest in a vertical direction. In cases where the object is a vehicle, the first extent may comprise a length of the vehicle in a direction of motion of the vehicle. The scanning procedure at block 1010 comprises a number of sub-blocks that are performed iteratively. During this iteration, different portions of the object along the first direction may be observed, e.g. different horizontal slices of a person or different vertical slices of a moving vehicle.

A first sub-block 1030 of the scanning procedure 1010 comprises receiving electromagnetic radiation from a second extent of the object at an imaging assembly of a terrestrial terahertz imaging system. The imaging assembly and terrestrial terahertz imaging system may comprise any of those described in previous examples, including the imaging assemblies 120, 220, 320, 620 and 720. The second extent of the object is in a second direction that is orthogonal to the first direction. The second extent may relate to a fixed field of view of the terrestrial terahertz imaging system. In cases where the object is a person of interest, the second extent may comprise a width of the person of interest in a horizontal direction. In cases where the object is a vehicle, the second extent may comprise a height of the vehicle, A second sub-block 1040 of the scanning procedure 1010 comprises providing relative movement in the first direction. This may be provided actively, e.g. using a scanning device comprising rotatable mirrors where the angle of rotation may be controlled, or passively, e.g. by relying on relative motion of one or more of the terrestrial terahertz imaging system and the object of interest in the first direction. In the active case, a scanning device may comprise two flat mirrors that operate in antiphase as described with reference to FIG. 3C. In a passive case, a vehicle may drive past an observation point to provide the relative motion in the first direction. In an active case, electric stepper motors and the like may be used to control an angle of scanning optical components.

As shown in FIG. 10, sub-blocks 1030 and 1040 are repeatedly performed for different slices of the object that extend in the second direction, e.g. different horizontal slices of a person or different vertical slices of a vehicle. This may comprise enacting relative movement following sub-block 1040, e.g. moving mirrors in a scanning device, or may occur naturally due to movement of the object.

Following the completion of the scanning procedure at block 1010, a two-dimensional image of the object is generated at block 1020. This two-dimensional image includes the first extent and the second extent of the object and uses data read from a terahertz radiation detector of the terrestrial terahertz imaging system during the scanning procedure. For example, the terahertz radiation detector may comprise a detector array that has detector elements that extend in a direction corresponding to the second extent, e.g. across the fixed field of view.

In certain examples, sub-block 1030 is performed with an imaging assembly comprising reflective optical components arranged in a confocal configuration that is arranged to image at finite conjugates. The imaging assembly directs the terahertz radiation into a receiver assembly comprising a cryostat containing the terahertz radiation detector and reflective cold re-imaging optical components. The reflective cold re-imaging optical components may comprise a reflective, confocal optical relay, e.g. as shown in FIGS. 2A, 2B, 4 and 5. In this case, sub-block 1040 may comprise receiving, from the reflective cold re-imaging optical components, the terahertz radiation at a detector array, where the detector array captures an image covering the second extent of the object at the terahertz radiation detector.

In certain examples, the sub-block 1040 of the scanning procedure 1010 comprises directing one or more mirrors within a periscope scanner to vertically scan a person of interest.

In cases where the object is a moving object, the method may comprises directing a pointing mirror at the object at a first location and performing the scanning procedure at block 1010. For example, this may comprise performing the scanning procedure at block 1010 for the example of FIG. 8A and the first position 840A of the object 840. The method may then further comprise directing the pointing mirror at the object at a second location following motion of the object and performing the scanning procedure at block 1010. For example, this may comprise performing the scanning procedure at block 1010 for the example of FIG. 8B and the second position 840A of the object 840. These operations may also be performed in a similar manner for the example of FIG. 9. In the case of FIG. 9, the scanning procedure may be performed for four or more different orientations of the pointing mirror. In these cases, block 1020 may comprise generating at least two two-dimensional images of the object, each two-dimensional image featuring the object at a different orientation. In one case, this method may be adapted to generate a video of the object in motion. In another case, the method 1000 may be iterated to generate a video of the object over time.

In certain examples the method 1000 of FIG. 10 may be adapted to provide a method for performing a security scan of a vehicle. In this case, the method may comprise capturing a plurality of one-dimensional images of the vehicle using a detector array of a terahertz imaging system and assembling a two-dimensional image from the plurality of one-dimensional images. In this case, each of the plurality of one-dimensional images may extend in an imaging direction, the imaging direction including a first extent of the vehicle and being perpendicular to a motion direction for the vehicle. The plurality of images may thus be captured as the vehicle moves in the motion direction. In this case, the two-dimensional image includes the first extent of the vehicle and a second extent of the vehicle in the motion direction, wherein the two-dimensional image indicating contents of the vehicle that are not visible from an exterior of the vehicle.

Figure 11:
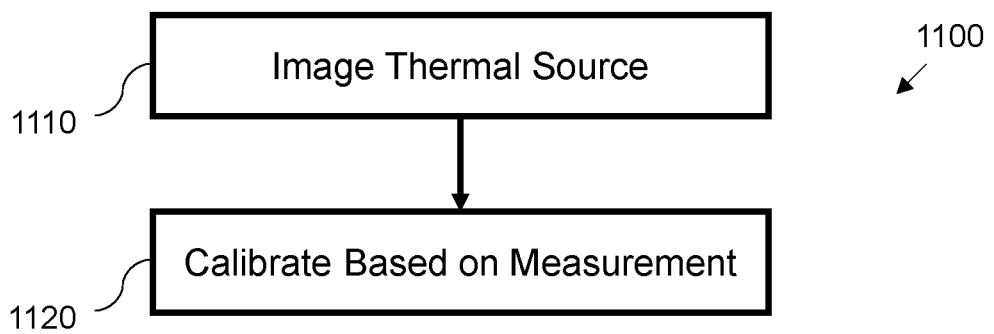
FIG. 11 is a flow diagram showing a method of calibrating a terahertz imaging system according to an example.

FIG. 11 shows a method 1100 of calibrating a terrestrial terahertz imaging system. This method may be used to calibrate any of the previously described terrestrial terahertz imaging systems. At block 1110, the method 1100 comprises imaging a thermal source with a terahertz radiation detector of a terrestrial terahertz imaging system to generate a calibration measurement. The thermal source is heated to a predefined temperature to perform the calibration procedure. At block 1120, the terrestrial terahertz imaging system is calibrated based on the calibration measurement. For example, the intensity measured by a detector of the terrestrial terahertz imaging system should be constant for a thermal source having a predefined temperature. Hence, any variations in intensity as recorded by the detector may be measured and used to compensate subsequent read-outs from the detector. In the case that the detector comprises a detector array, such as a lumped element kinetic inductance array, each element of the detector array that views the thermal source should register a common intensity measurement for a thermal source that is heated to a predefined temperature (e.g. where the temperature may be guaranteed within a particular range along the length of the source). Thus, any variation in intensity determined from block 1110 may be used to adjust future readings to compensate for the variation. In certain cases, the thermal source may comprise a conductive rod or bar, e.g. that may be electrically heated to a controlled temperature. In other cases, the thermal source may comprise a semiconductor and/or series of semiconductor layers configured to have controllable thermal properties and/or terahertz emissions.

Figure 12:
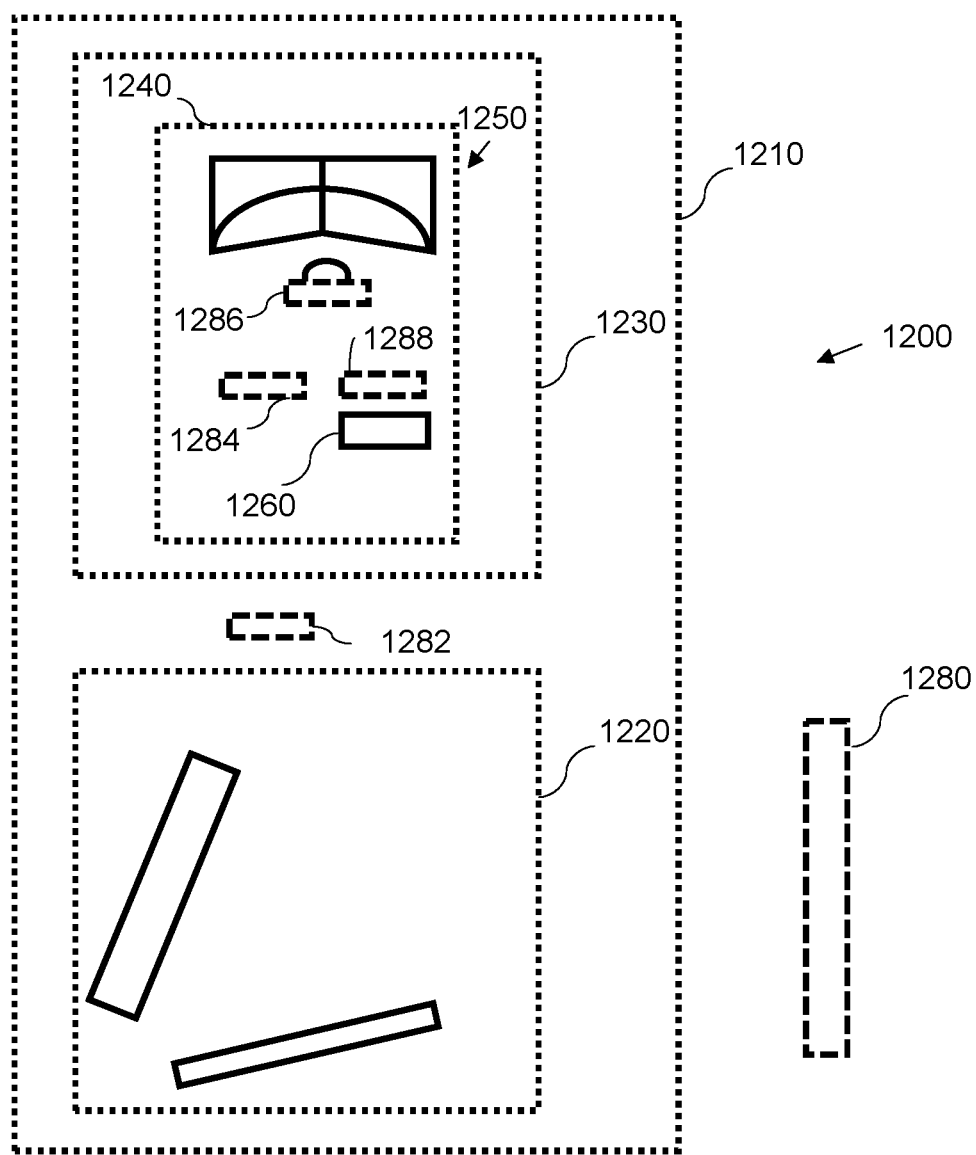
FIG. 12 is a schematic illustration showing possible positions for a thermal source for performing the method of FIG. 11.

FIG. 12 shows a variation of FIG. 2A that indicates possible locations for the thermal source within an optical path of an example terrestrial terahertz imaging system 1200. Components that are common with the example of FIG. 2A are labelled using corresponding reference numerals. As per FIG. 2A, the terrestrial terahertz imaging system 1200 comprises an imaging assembly 1220, a receiver assembly 1230, a cryostat 1240, re-imaging optics 1250 and a detector 1260.

In FIG. 12, five possible example positions 1280 to 1288 are shown for the thermal source. Each position is a position in the optical path. The term "optical path" is used herein to refer to a position that is observable by the detector 1260. In certain cases, the thermal source may be removably located within the optical path, e.g. it may be mechanically moved into the optical path during a calibration mode and moved out of the optical path for an imaging mode. In another case, the thermal source may be at an edge of a scanning range. For example, with the body scanning example described herein the thermal source may be located such that it is imaged at one of the edges of the scanned vertical field of view, where during imaging the scanned field of view is reduced by one or more lines of elements and/or wherein certain rows or columns of a measured image are ignored and/or removed to provide an output image.

The detector 1260 may comprise a detector array. In this case, a thermal source may be imaged with all of the detector elements or a subset of detector elements. In the latter case, in the vehicle scanning example, the detector elements that correspond to the edges of the fixed vertical field of view may image an internal or external thermal source. Although not all detector elements provide a reading relating to the thermal source, the readings from one or more edge detector elements may still be used to calibrate a base level of operation for the detector array. For example, a known or pre-measured relationship between the one or more edge detector elements and the inner detector elements may be used to calibrate all (or at least a larger subset of) detector elements.

FIG. 12 shows a first thermal source 1280 that is external to the terrestrial terahertz imaging system 1200. In one case this may be held by an operative of the system and/or placed at the entrance pupil of the system. Second to fifth thermal sources 1282 to 1288 are located within the terrestrial terahertz imaging system 1200 (i.e. are "internal"). Providing an internal thermal source may be preferred as the properties of the thermal source may be more accurately controlled and calibration of the terrestrial terahertz imaging system 1200 may be performed using no additional components. The second thermal position 1282 is located between the imaging assembly 1220 and the receiver assembly 1230, near the system focus for implementations where the system is configured with a focus near the cryostat window. The second thermal position 1282 may be easier to implement as it is located outside of the cryostat 1240.

The third to fifth positions 1284, 1286 and 1288 are located within the cryostat 1240. The third position 1284 is located at an internal focus before the re-imaging optics 1250, the fourth position 1286 is a location that is at the cold stop of the re-imaging optics 1250 and the fifth position 1288 is a position between the re-imaging optics 1250 and the detector 1260. The fourth position 1288 may include a position behind an aperture in a reflective cold stop of the re-imaging optics 1250—in this case the re-imaging optics 1250 may form part of a larger re-imaging assembly that may comprise the thermal source. The re-imaging assembly may also comprise other feedhorn couplings and/or may form a package for the detector 1260. The fourth position 1286 may be an especially convenient location for the thermal source and may allow for detector flat-fielding. With a scanning system, such as the vertical scanning system of the body scanner example described herein, the thermal source in the fourth position 1286 may be observed as the vertical scan is performed. In certain cases, the thermal source may be heated to a plurality of different predetermined temperatures as part of the calibration. The thermal source may be intermittently heated to a predefined temperature to perform the calibration procedure. For example, the method 1200 may be performed daily at defined calibration periods. The calibration may be relatively quick and may be performed as system start-up procedure or scheduled status-check.

Although certain examples are described herein with reference to a terrestrial terahertz imaging system, the optical components of the aforementioned examples may also be applied in other applications that are not a terrestrial terahertz imaging system. In this case, an optical system may comprise two sets of optical components corresponding to the aforementioned examples of the imaging assembly and re-imaging optics. The first set of optical components, which may be based on the imaging assembly examples, are configured to generate a first image of an object, where the first set of optical components are arranged in a confocal configuration and comprise a first paraboloid mirror and a second hyperboloid mirror. The first paraboloid mirror and a second hyperboloid mirror may be configured to image at finite conjugates. The second set of optical components, which may be based on the examples of re-imaging optics, are configured to generate a second image of an object on receipt of electromagnetic radiation from the first set of optical components, the second set of optical components being arranged in a reflective optical relay configuration. The second set of optical components may comprise a confocal arrangement of two ellipsoid mirrors and a hyperboloid cold stop.

Certain examples described herein provide a high degree of flexibility with regard to different terahertz imaging requirements. Certain examples described herein can produce diffraction-limited images at ranges of 3 m or so up to infinity. This contrasts with comparative telescope designs for astronomy that image at much larger distances.

Certain examples described herein provide an all-reflective system, e.g. the described optical components that form the imaging pipeline are reflective not refractive. This means that observing frequencies can be simply changed within the terrestrial terahertz imaging system to suit the requirements of the observational situation. It also allows for multi-frequency observations, e.g. via system upgrade. Certain examples described herein provide an all-reflective system, with a cold stop within the cryostat. This improves imaging quality and helps remove background noise.

In certain examples described herein, a receiver assembly of a terrestrial terahertz imaging system is fed vertically from a base that includes an imaging assembly. In these cases, the receiver assembly may be moveable in at least one direction relative to the imaging assembly to allow for re-focussing at different target ranges. For example, re-focussing for different target ranges may be achieved by simply raising or lowering the receiver assembly. This is not possible for other comparative configurations.

Certain examples described herein provide an imaging assembly that may be seen to provide a form of modified Dragone configuration comprising reflective optical components arranged in a confocal configuration that is arranged to image at finite conjugates. This imaging assembly is able to provide an image of a wide instantaneous diffraction-limited field of view at a modest imaging range (as compared to comparative telescope configurations). The imaging assembly is also able to provide relatively high spatial resolution images at THz frequencies by the provision of a large diameter entrance pupil. Imaging optics within the receiver assembly, e.g. reflective cold re-imaging optical components comprising a reflective confocal optical relay, are configured to interact synergistically with the proposed imaging assembly to provide improved imaging quality. For example, hyperboloid and ellipsoid mirror configurations may be designed to correct for warm mirror aberrations across a wide field of view.

Certain examples described herein allow for imaging at low f-numbers. For example, the terrestrial terahertz imaging system may be configured with an f-number of 2.4. It is not obvious how all the components of conventional telescopes and reimaging systems may be adapted for wide-field, large-aperture, close range imaging. Certain examples described herein present all-reflective optical components with confocal arrangements and non-spherical characteristics, which then allow for closer range terahertz imaging.

Certain examples described herein, provide an imaging assembly that may be arranged to receive electromagnetic radiation from a fixed angular field of view at a distance greater than 3 m. Near a range of 3 m, the terrestrial terahertz imaging system may allow for imaging at higher spatial resolutions. Certain test examples have been designed and implemented with optimal optical performance at target object distances of around 7.5 m, e.g. for a body scanner implementation. In certain examples, the instantaneous full field of view of the imaging system may be around and/or greater than 6 degree in at least one dimension.

Certain examples of a terrestrial terahertz imaging system as described herein may be used to implement one or more of a vehicle scanning and a body scanning device. In one case, a common device may implement both functions in two different configurations. For example, in the latter case as compared to the former case, a receiver assembly may be rotated 90 degrees and a scanning device coupled to the imaging assembly. This thus provides possibly portable and flexible security scanning applications. In certain cases, the body scanning device, which may be the larger of the two configurations, may be around 1 m in width, around 2-2.5 m in length and around 2 m in height. This allows the system to possibly be vehicle-mounted.

Certain examples described herein provide a high-sensitivity terahertz imaging system for close range imaging with optimised optical pathways and couplings and good noise-suppression. These examples thus have potential for use in practical security scanning applications in the real-world.

The above examples are to be understood as illustrative of the invention. Further examples are envisaged. Certain methods described herein may be stored as instructions on a non-transitory computer-readable storage medium or as a computer program for processing by a processor of a computing device (including microcontrollers). It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A terrestrial terahertz imaging system comprising:
    an imaging assembly to form a first image of at least a portion of an object using electromagnetic radiation in a terahertz band of frequencies; and
    a receiver assembly comprising a cryostat, the cryostat containing:
        a detector, and
        reflective cold re-imaging optical components to receive the electromagnetic radiation from the imaging assembly and to form a second image of at least a portion of the object on the detector;
    wherein the imaging assembly comprises reflective optical components arranged in a confocal configuration that is arranged to image at finite conjugates, and
    wherein the reflective cold re-imaging optical components comprise a reflective, confocal optical relay;
    wherein the system further comprises a scanning device to scan a field of view and direct the received electromagnetic radiation into the imaging assembly;
    wherein the scanning device comprises a periscope scanner;

wherein the periscope scanner comprises a pair of flat scanning mirrors to receive the electromagnetic radiation from the object and to direct it to the imaging assembly, wherein the pair of flat scanning mirrors operate in anti-phase.

2. The terrestrial terahertz imaging system of claim 1, wherein the optical relay comprises a confocal arrangement of one or more ellipsoid mirrors and a hyperboloid reflective cold stop.

3. The terrestrial terahertz imaging system of claim 1, wherein the imaging assembly comprises a first paraboloid mirror and a second hyperboloid mirror, the second hyperboloid mirror being configured to direct electromagnetic radiation into the receiver assembly.

4. The terrestrial terahertz imaging system of claim 1, wherein the imaging assembly is arranged to receive electromagnetic radiation from a fixed angular field of view at a distance greater than 1 metre.

5. The terrestrial terahertz imaging system of claim 1, wherein the instantaneous full field of view of the imaging system is greater than or equal to 6 degrees in at least one dimension.

6. The terrestrial terahertz imaging system of claim 1, comprising:
an external pointing mirror to direct the electromagnetic radiation towards the imaging assembly as the object moves perpendicularly to an optical axis of the imaging assembly.

7. The terrestrial terahertz imaging system of claim 1, wherein the detector is a superconducting detector array.

8. The terrestrial terahertz imaging system of claim 1, comprising one or more metamaterial optical filters to reject short-wave infrared radiation and to define the spectral bandpass.

9. The terrestrial terahertz imaging system of claim 8, wherein the one or more metamaterial optical filters include the use of anti-reflection coatings of optical components to optimise signal gathering efficiency.

10. The terrestrial terahertz imaging system of claim 1, wherein the detector comprises a rear absorber layer, for example to counteract the deleterious effect of unwanted photons and/or phonons.

11. A terahertz vehicle imaging device comprising:
first imaging optics to receive terahertz radiation from a vehicle of interest;
a receiver assembly comprising a cryostat, the cryostat containing second imaging optics and a terahertz radiation detector array, the second imaging optics being configured to form at least a one-dimensional image on the terahertz radiation detector array; and
imaging electronics to generate an image of the vehicle of interest using signals read from the terahertz radiation detector array,
wherein the first imaging optics are configured to direct the terahertz radiation into the receiver assembly,
wherein the first and second imaging optics have an instantaneous vertical field of view that encompasses a height of the vehicle of interest, and
wherein the image of the vehicle of interest is generated following relative movement of the vehicle of interest with respect to the terahertz vehicle scanning device.

12. A method of scanning an object using a terrestrial terahertz imaging system, the method comprising:
during a scanning procedure that scans a first extent of the object in a first direction, iteratively, for different portions of the object along the first direction:
receiving electromagnetic radiation from a second extent of the object at an imaging assembly of a terrestrial terahertz imaging system, the second extent of the object being in a second direction that is orthogonal to the first direction, wherein the imaging assembly comprises reflective optical components arranged in a confocal configuration that is arranged to image at finite conjugates;
directing the electromagnetic radiation into a receiver assembly of the terrestrial terahertz imaging system, the receiver assembly comprising a cryostat containing a terahertz radiation detector and reflective cold re-imaging optical components, the reflective cold re-imaging optical components comprising a reflective, confocal optical relay; and
receiving, from the reflective cold re-imaging optical components, the electromagnetic radiation at a detector array of the terrestrial terahertz imaging system, the detector array capturing an image covering the second extent of the object at the terahertz radiation detector; and
generating a two-dimensional image of the object including the first extent and the second extent using data read from the terahertz radiation detector during the scanning procedure;
wherein the object is a moving object and the method comprises:
directing a pointing mirror at the object at a first location and performing the scanning procedure; and
directing the pointing mirror at the object at a second location following motion of the object and performing the scanning procedure,
wherein generating a two-dimensional image of the object comprises generating at least two two-dimensional images of the object, each two-dimensional image featuring the object at a different orientation.

13. The method of claim 12, wherein the object is a person of interest, the first extent comprises a height of the person of interest in a vertical direction and the second extent comprises a width of the person of interest in a horizontal direction.

14. The method of claim 13, wherein the scanning procedure comprises:
directing one or more mirrors within a periscope scanner to vertically scan the person of interest.

15. The method of claim 12, wherein generating a two-dimensional image of the object comprises:
generating a video of the object in motion.

16. The method of claim 12, wherein the scanning procedure is performed for four or more different orientations of the pointing mirror.

17. The method of claim 12, wherein the object is a vehicle, the first extent comprises a length of the vehicle in a direction of motion of the vehicle and the second extent comprises a height of the vehicle, wherein the scanning procedure is performed using relative motion between the vehicle and the terrestrial terahertz imaging system.

18. A method of scanning an object using a terrestrial terahertz imaging system, the method comprising:
during a scanning procedure that scans a first extent of the object in a first direction, iteratively, for different portions of the object along the first direction:
receiving electromagnetic radiation from a second extent of the object at an imaging assembly of a terrestrial terahertz imaging system, the second extent of the object being in a second direction that is orthogonal to the first direction, wherein the imaging assembly comprises reflective optical components arranged in a confocal configuration that is arranged to image at finite conjugates;

directing the electromagnetic radiation into a receiver assembly of the terrestrial terahertz imaging system, the receiver assembly comprising a cryostat containing a terahertz radiation detector and reflective cold re-imaging optical components, the reflective cold re-imaging optical components comprising a reflective, confocal optical relay; and receiving, from the reflective cold re-imaging optical components, the electromagnetic radiation at a detector array of the terrestrial terahertz imaging system, the detector array capturing an image covering the second extent of the object at the terahertz radiation detector; and generating a two-dimensional image of the object including the first extent and the second extent using data read from the terahertz radiation detector during the scanning procedure;

wherein the object is a vehicle, the first extent comprises a length of the vehicle in a direction of motion of the vehicle and the second extent comprises a height of the vehicle, wherein the scanning procedure is performed using relative motion between the vehicle and the terrestrial terahertz imaging system.

* * * * *